US010888770B2

(12) United States Patent
Onozawa et al.

(10) Patent No.: US 10,888,770 B2
(45) Date of Patent: Jan. 12, 2021

(54) GAME SYSTEM, ACCESSORY, STORAGE MEDIUM HAVING STORED THEREIN GAME PROGRAM, AND GAME PROCESSING METHOD

(71) Applicant: NINTENDO CO., LTD., Kyoto (JP)

(72) Inventors: Yuki Onozawa, Kyoto (JP); Kochi Kawai, Kyoto (JP); Shotaro Goto, Kyoto (JP); Junichiro Miyatake, Kyoto (JP); Hiroshi Yamamoto, Kyoto (JP)

(73) Assignee: Nintendo Co., Ltd., Kyoto (JP)

(*) Notice: Subject to any disclaimer, the term of this patent is extended or adjusted under 35 U.S.C. 154(b) by 0 days.

(21) Appl. No.: 16/018,470

(22) Filed: Jun. 26, 2018

(65) Prior Publication Data
US 2019/0030423 A1    Jan. 31, 2019

(30) Foreign Application Priority Data

Jul. 27, 2017   (JP) .................................. 2017-145354

(51) Int. Cl.
| | |
|---|---|
| A63F 13/00 | (2014.01) |
| A63F 9/24 | (2006.01) |
| A63F 13/211 | (2014.01) |
| A63F 13/24 | (2014.01) |
| A63F 13/98 | (2014.01) |
| A63F 13/23 | (2014.01) |

(Continued)

(52) U.S. Cl.
CPC ............ *A63F 13/211* (2014.09); *A63F 13/23* (2014.09); *A63F 13/24* (2014.09); *A63F 13/428* (2014.09); *A63F 13/98* (2014.09); *A63F 13/245* (2014.09); *A63F 13/92* (2014.09)

(58) Field of Classification Search
CPC ........ A63F 13/211; A63F 13/23; A63F 13/24; A63F 13/245; A63F 13/428; A63F 13/92; A63F 13/98

See application file for complete search history.

(56) References Cited

U.S. PATENT DOCUMENTS

| | | | | |
|---|---|---|---|---|
| 5,046,739 | A | * | 9/1991 | Reichow ................. A63F 13/02 273/148 B |
| 5,883,690 | A | * | 3/1999 | Meyers .................. A63F 13/02 345/161 |

(Continued)

FOREIGN PATENT DOCUMENTS

| | | |
|---|---|---|
| EP | 2 177 250 A2 | 4/2010 |
| EP | 3 057 297 A1 | 8/2016 |

(Continued)

OTHER PUBLICATIONS

Extended European Search Report dated Nov. 15, 2018 issued in European Application No. 18180102.8 (12 pgs.).

(Continued)

*Primary Examiner* — Milap Shah
(74) *Attorney, Agent, or Firm* — Nixon & Vanderhye, P.C.

(57) ABSTRACT

A first fixing portion of an accessory fixes a first game controller so as to rotate about at least a certain axis, and a second fixing portion of the accessory fixes a second game controller. Then, based on a difference value indicating a difference between a first value indicating an orientation of the first game controller and a second value indicating an orientation of the second game controller, a certain game process is executed.

27 Claims, 20 Drawing Sheets

US 10,888,770 B2

Page 2

(51) Int. Cl.
  A63F 13/428 (2014.01)
  A63F 13/92 (2014.01)
  A63F 13/245 (2014.01)

(56) References Cited

U.S. PATENT DOCUMENTS

| | | | | |
|---|---|---|---|---|
| 5,976,018 A * | 11/1999 | Druckman | ............... | A63F 13/08 463/47 |
| 6,241,247 B1 * | 6/2001 | Sternberg | ................. | A63F 13/06 273/148 B |
| 6,251,015 B1 * | 6/2001 | Caprai | ..................... | A63F 13/06 463/36 |
| 6,512,511 B2 * | 1/2003 | Willner | ................... | A63F 13/06 345/169 |
| 6,530,838 B2 * | 3/2003 | Ha | .......................... | A63F 13/06 463/36 |
| 6,811,491 B1 * | 11/2004 | Levenberg | ............... | A63F 13/02 463/47 |
| 7,095,442 B2 * | 8/2006 | van Zee | ................. | G06F 1/1626 348/333.01 |
| 7,425,947 B1 * | 9/2008 | Tseng | .................... | G06F 1/1622 345/156 |
| 7,833,097 B1 * | 11/2010 | Maddox | ................... | A63F 13/23 455/556.1 |
| 8,360,882 B2 * | 1/2013 | Liu | .......................... | A63F 13/06 463/37 |
| D688,311 S * | 8/2013 | Block | .......................... | D21/324 |
| D688,312 S * | 8/2013 | Block | .......................... | D21/324 |
| 8,882,596 B2 * | 11/2014 | Shimamura | ........... | A63F 13/211 463/37 |
| 8,972,617 B2 * | 3/2015 | Hirschman | ........... | G06F 3/0219 463/37 |
| 9,317,181 B2 * | 4/2016 | Sizelove | ............ | B64D 11/0015 |
| 9,895,606 B1 * | 2/2018 | Kamata | ................. | A63F 13/428 |
| 2003/0067111 A1 * | 4/2003 | Swan | ....................... | A63F 13/02 273/148 R |
| 2003/0171190 A1 * | 9/2003 | Rice | ....................... | A63F 13/803 482/57 |
| 2004/0056781 A1 * | 3/2004 | Rix | ....................... | G06F 3/0202 341/20 |
| 2004/0188933 A1 * | 9/2004 | Siciliano | ................. | A63F 13/02 273/148 B |
| 2006/0237209 A1 * | 10/2006 | Horinouchi | ............. | A63F 13/08 174/50 |
| 2006/0252537 A1 * | 11/2006 | Wu | .......................... | A63F 13/06 463/36 |
| 2006/0279039 A1 * | 12/2006 | Krieger | .................... | A63F 13/02 273/148 B |
| 2006/0286943 A1 * | 12/2006 | Vance | ..................... | A63F 13/06 455/90.1 |
| 2007/0021210 A1 * | 1/2007 | Tachibana | ............... | A63F 13/02 463/37 |
| 2007/0178966 A1 * | 8/2007 | Pohlman | .................. | A63F 13/06 463/36 |
| 2008/0015017 A1 * | 1/2008 | Ashida | .................... | A63F 13/02 463/37 |
| 2008/0076567 A1 * | 3/2008 | Dohta | ..................... | A63F 13/10 463/37 |
| 2008/0153592 A1 * | 6/2008 | James-Herbert | ........ | A63F 13/08 463/36 |
| 2008/0153593 A1 * | 6/2008 | Ikeda | ..................... | A63F 13/24 463/37 |
| 2009/0054146 A1 * | 2/2009 | Epstein | .................... | A63F 13/06 463/38 |
| 2009/0069096 A1 * | 3/2009 | Nishimoto | ............ | A63F 13/211 463/43 |
| 2009/0070093 A1 * | 3/2009 | Nakanishi | ................ | A63F 13/00 703/22 |
| 2009/0111508 A1 * | 4/2009 | Yeh | ........................ | G06F 1/1624 455/552.1 |
| 2009/0191967 A1 * | 7/2009 | Konishi | ................... | A63F 13/06 463/37 |
| 2010/0009751 A1 | 1/2010 | Shimamura et al. | | |
| 2010/0137066 A1 | 6/2010 | Cheng et al. | | |
| 2010/0195279 A1 * | 8/2010 | Michael | ................ | G06F 1/1632 361/679.41 |
| 2011/0053691 A1 * | 3/2011 | Bryant | ................... | A63F 13/211 463/37 |
| 2011/0105231 A1 * | 5/2011 | Ambinder | ............... | A63F 13/24 463/38 |
| 2011/0263328 A1 | 10/2011 | Yamashita et al. | | |
| 2011/0275437 A1 * | 11/2011 | Minchella Jennings | ..................... | A63F 13/98 463/38 |
| 2012/0040758 A1 * | 2/2012 | Hovseth | ................ | A63F 13/803 463/37 |
| 2012/0088582 A1 * | 4/2012 | Wu | ........................ | A63F 13/211 463/37 |
| 2012/0252584 A1 * | 10/2012 | Mitchell | ................. | A63F 13/98 463/47 |
| 2013/0058659 A1 * | 3/2013 | Umezu | ............. | H04B 10/1143 398/128 |
| 2013/0109476 A1 * | 5/2013 | Baum | ..................... | A63F 13/92 463/37 |
| 2013/0157764 A1 * | 6/2013 | Joynes | .................... | A63F 13/06 463/37 |
| 2013/0341214 A1 * | 12/2013 | King | ........................ | A63F 13/06 206/216 |
| 2014/0206451 A1 * | 7/2014 | Helmes | ................. | G06F 1/1632 463/39 |
| 2014/0221098 A1 * | 8/2014 | Boulanger | ........... | G06F 1/1684 463/37 |
| 2014/0274394 A1 * | 9/2014 | Willis | .................... | G06F 1/1632 463/37 |
| 2015/0018101 A1 * | 1/2015 | Schoenith | ............... | A63F 13/98 463/37 |
| 2015/0273325 A1 * | 10/2015 | Falc | ................... | G06F 1/1626 463/37 |
| 2015/0281422 A1 * | 10/2015 | Kessler | ................... | G06F 1/169 455/557 |
| 2016/0107082 A1 * | 4/2016 | Song | ...................... | A63F 13/92 463/37 |
| 2016/0231773 A1 * | 8/2016 | Inoue | ..................... | A63F 13/24 |
| 2016/0361632 A1 * | 12/2016 | Fujita | .................... | A63F 13/235 |
| 2016/0361641 A1 * | 12/2016 | Koizumi | ................. | A63F 13/24 |
| 2018/0250584 A1 * | 9/2018 | Obayashi | ................ | A63F 13/98 |
| 2018/0250588 A1 * | 9/2018 | Winick | .................... | A63F 13/92 |

FOREIGN PATENT DOCUMENTS

| | | |
|---|---|---|
| EP | 3 103 534 A2 | 12/2016 |
| JP | 2002-113264 | 4/2002 |
| JP | 2002-366270 | 12/2002 |
| JP | 2010-17404 | 1/2010 |
| JP | 2011-227804 | 11/2011 |
| JP | 2013-13739 | 1/2013 |
| KR | 20090120329 A * | 11/2009 |
| WO | WO 01/29646 | 4/2001 |

OTHER PUBLICATIONS

Wii game review, "Family Fishing", GAME Watch, [On line], Aug. 13, 2011, Internet URL: https://game.watch.impress.co.jp/docs/review/ 467429.html (8 pgs.).

Notice of Reasons for Refusal of JP2017-145354, dispatched on Jun. 5, 2018 (6 pgs.) with its English machine translation (4 pgs.).

Notice of Reasons for Refusal of JP2017-145354, dispatched on Sep. 26, 2018 (4 pgs.) with its English machine translation (3 pgs.).

* cited by examiner

F I G. 1 1
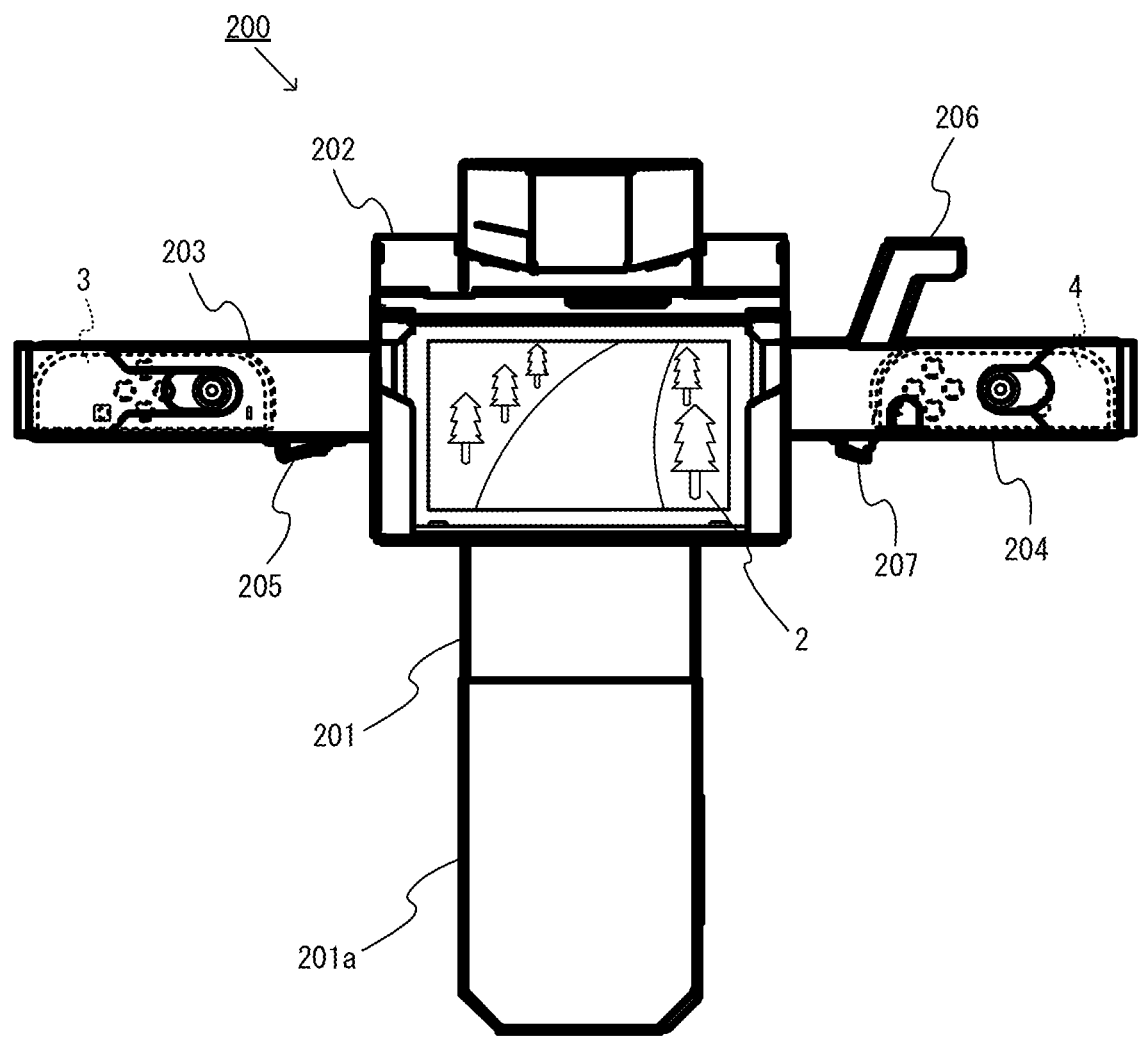

F I G. 1 4
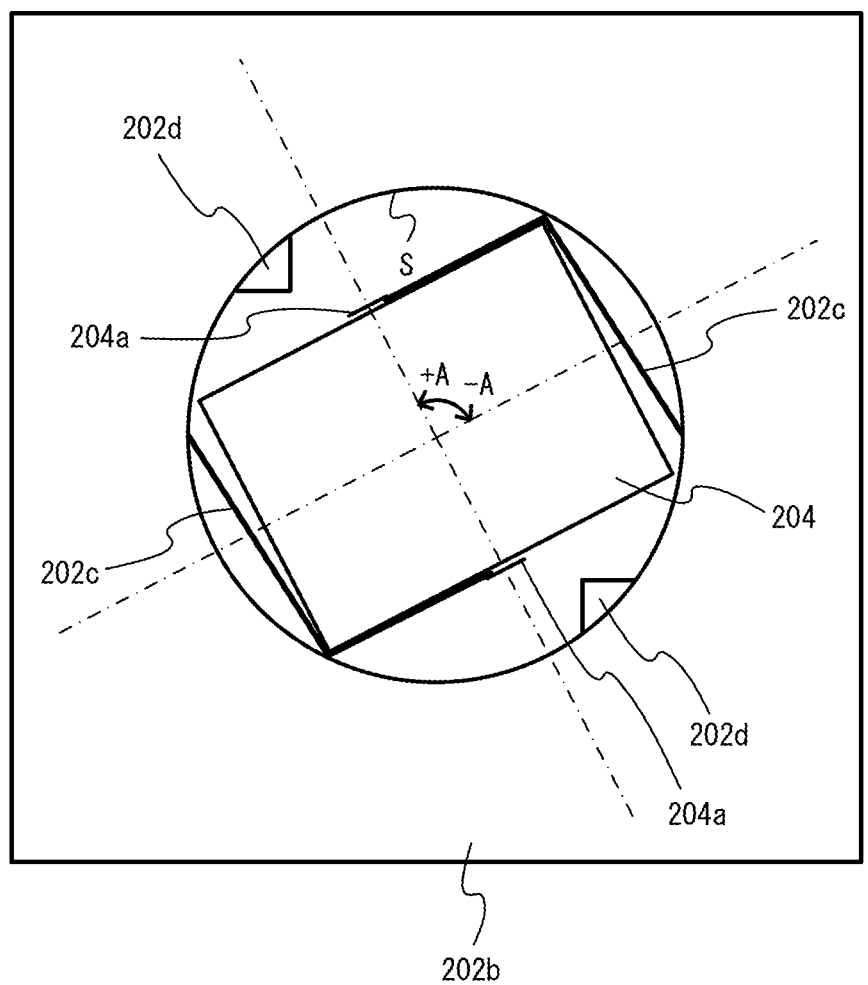

F I G. 1 5
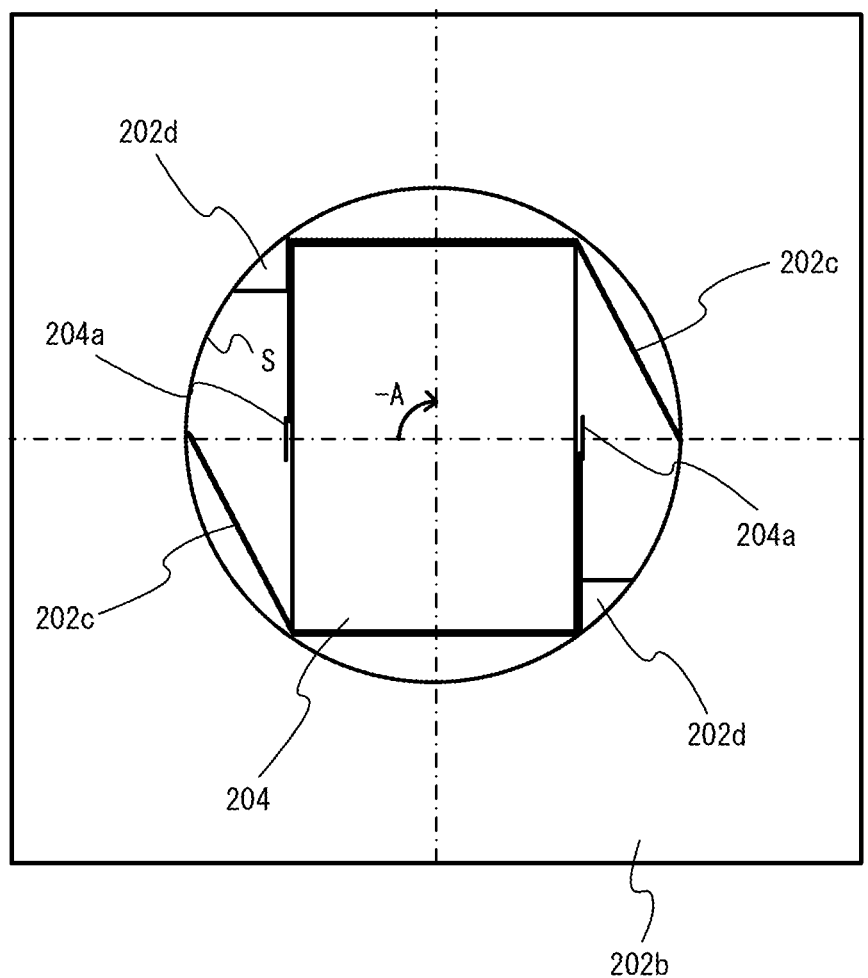

F I G. 2 0
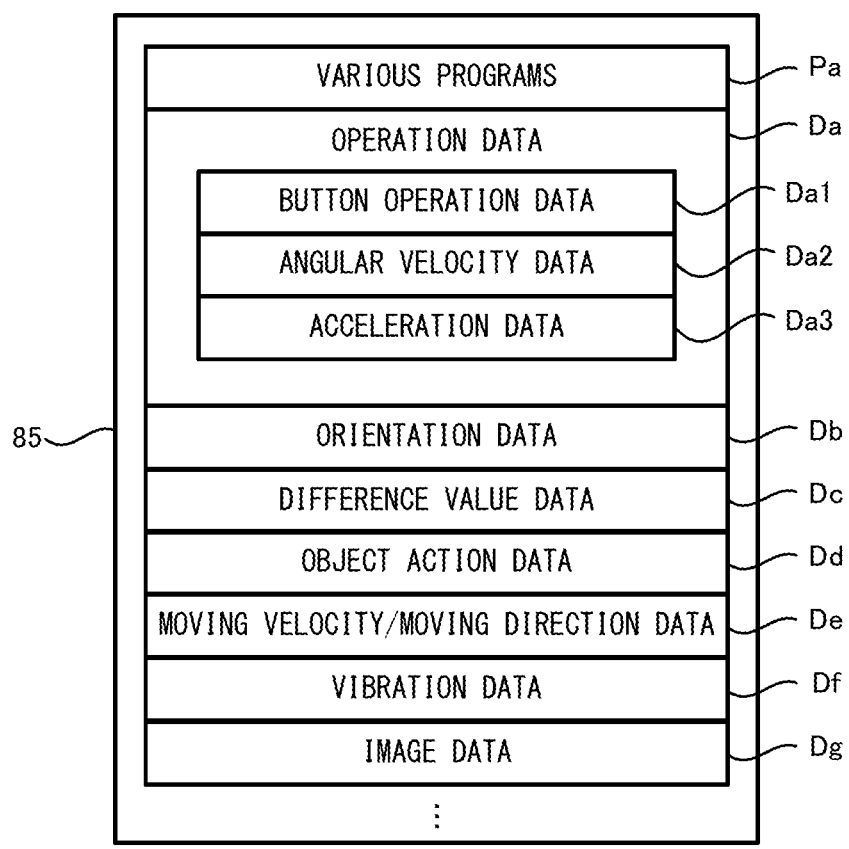

GAME SYSTEM, ACCESSORY, STORAGE MEDIUM HAVING STORED THEREIN GAME PROGRAM, AND GAME PROCESSING METHOD

CROSS REFERENCE TO RELATED APPLICATION

The disclosure of Japanese Patent Application No. 2017-145354, filed on Jul. 27, 2017, is incorporated herein by reference.

FIELD

The technology shown here relates to a game system, an accessory, a storage medium having stored therein a game program, and a game processing method for performing game processing using a plurality of game controllers.

BACKGROUND AND SUMMARY

Conventionally, there is an accessory that is attached to a game controller, thereby adding a function to the game controller.

In the accessory, however, there is room for improvement in performing various operations based on the orientation of the game controller.

Therefore, it is an object of an exemplary embodiment to provide a game system, an accessory, a storage medium having stored therein a game program, and a game processing method capable of improving the variety of operations using orientations.

To achieve the above object, the exemplary embodiment can employ, for example, the following configurations. It should be noted that it is understood that, to interpret the descriptions of the claims, the scope of the claims should be interpreted only by the descriptions of the claims. If there is a conflict between the descriptions of the claims and the descriptions of the specification, the descriptions of the claims take precedence.

In an exemplary configuration of a game system according to the exemplary embodiment, a game system comprises a first game controller comprising a first gyro sensor, a second game controller comprising a second gyro sensor, an accessory to and from which the first game controller and the second game controller are attachable and detachable, and a computer configured to execute game processing. The accessory comprises a first fixing portion and a second fixing portion. The first fixing portion fixes the first game controller so as to rotate about at least a certain axis. The second fixing portion fixes the second game controller. The game system further comprises a computer configured to: based on an output from the first gyro sensor of the first game controller fixed to the first fixing portion, calculate a first value indicating an orientation of the first game controller; based on an output from the second gyro sensor of the second game controller fixed to the second fixing portion, calculate a second value indicating an orientation of the second game controller; and calculate a difference value indicating a difference between the first value and the second value. The computer configured to execute the game processing executes a first game process based on the difference value.

Based on the above, based on a difference value between a first value indicating an orientation of a first game controller and a second value indicating an orientation of a second game controller, it is possible to detect the content of an operation on an accessory. Thus, it is possible to improve the variety of operations using the orientation of the first game controller and the orientation of the second game controller. Further, the first game controller and the second game controller are attached to the accessory, whereby the first game controller is attached so as to rotate about at least a predetermined axis relative to the accessory. Thus, the difference value between the first value indicating the orientation of the first game controller and the second value indicating the orientation of the second game controller is calculated, and both controllers are attached to the accessory, whereby it is possible to easily extract a rotational action of the first game controller about the predetermined axis in the accessory. Thus, it is possible to perform game processing based on the content of the rotational action.

Further, based on the orientation of the first game controller or the orientation of the second game controller, the computer configured to execute the game processing may further execute a second game process different from the first game process.

Based on the above, game processing can be performed not only based on the difference value but also based on the orientation of the first game controller or the orientation of the second game controller. Thus, it is possible to further improve the variety of operations using the orientation of the first game controller and the orientation of the second game controller.

Further, the second game process may be a process of performing orientation control for controlling an orientation of a game object based on at least one of the orientation of the first game controller and the orientation of the second game controller.

Based on the above, aside from first game process, based on at least one of the orientation of the first game controller and the orientation of the second game controller, it is possible to perform game processing for controlling the orientation of a game object. Thus, it is possible to perform operations with more variety.

Further, the first game process may be a process of, based on the difference value, controlling a motion of the game object in a manner different from the orientation control.

Based on the above, aside from the orientation control of the game object, it is possible to control the motion of the game object based on the difference value between the first value indicating the orientation of the first game controller and the second value indicating the orientation of the second game controller. Thus, it is possible to perform various operations using both the orientation of the first game controller and the orientation of the second game controller.

Further, the first game process may be a process of, based on the difference value, controlling at least one of a moving velocity, an acceleration, and a moving distance of the game object in a virtual space.

Based on the above, based on the difference value between the first value indicating the orientation of the first game controller and the second value indicating the orientation of the second game controller, it is possible to control at least one of a moving velocity, an acceleration, and a moving distance of the game object in a virtual space. Thus, it is possible to perform various operations using the orientations of game controllers.

Further, the second fixing portion may fix the second game controller so that the second game controller does not rotate about an axis parallel to or approximately parallel to the certain axis.

Based on the above, based on the difference value between the first value indicating the orientation of the first game controller and the second value indicating the orientation of the second game controller, it is possible to estimate the rotational action of the first game controller about the predetermined axis relative to the second game controller.

Further, the first fixing portion may fix the first game controller so that the first game controller rotates about the certain axis relative to the second game controller fixed to the second fixing portion.

Based on the above, based on the difference value between the first value indicating the orientation of the first game controller and the second value indicating the orientation of the second game controller, it is possible to estimate the rotational action of the first game controller about the predetermined axis relative to the second game controller.

Further, the accessory may further comprise a biasing portion. The a biasing portion, when the first game controller fixed to the first fixing portion rotates in a first direction about the certain axis, biases the first game controller so as to rotate in a direction opposite to the first direction.

Based on the above, even when an operation is not performed on the first game controller fixed to a first fixing portion, it is possible to control the orientation of the first game controller in real space.

Further, the accessory may further comprise a first rotation restriction portion. Then first rotation restriction portion restricts rotation so that the first game controller fixed to the first fixing portion does not rotate in a direction opposite to the first direction beyond a first angle.

Based on the above, when an operation is not performed on the first game controller fixed to the first fixing portion, it is possible to set an initial orientation of the first game controller in real space.

Further, the accessory may further comprise a second rotation restriction portion. The second rotation restriction portion restricts rotation so that the first game controller fixed to the first fixing portion does not rotate in the first direction beyond a second angle.

Based on the above, it is possible to restrict the amount of operation on the first game controller fixed to the first fixing portion.

Further, when the first game controller fixed to the first fixing portion is at an angle between the first angle and the second angle, the biasing portion may bias the first game controller so as to rotate toward the first angle.

Based on the above, when an operation is not performed on the first game controller fixed to the first fixing portion, it is possible to change back the orientation of the first game controller to the set initial orientation.

Further, the accessory may further comprise a main body portion. To the main body portion, a display screen is attached. In the main body portion, a first side surface and a second side surface may be formed to the left and right of an attachment position of the display screen. In this case, the first fixing portion may be on the first side surface side. The second fixing portion may be on the second side surface side.

Based on the above, it is possible to perform game play while viewing a display device attached near the center of the accessory.

Further, the accessory may further comprise a supporting portion. The supporting portion supports the main body portion. The main body portion may rotate together with the first fixing portion and the second fixing portion about the supporting portion.

Based on the above, it is possible to perform the operation of rotation the first game controller and the second game controller, independently of the rotation about the predetermined axis.

Further, the accessory may further comprise a shaft portion. The shaft portion rotates the first fixing portion and the second fixing portion together.

Based on the above, it is possible to perform the operation of rotation the first game controller and the second game controller, independently of the rotation about the predetermined axis.

Further, the first fixing portion may be on one side of the accessory. The second fixing portion may be on the other side of the accessory, which is the opposite side of the first fixing portion.

Based on the above, by attaching the first game controller and the second game controller to both sides of the accessory, it is possible to perform game play where the accessory is operated.

Further, each of the first game controller and the second game controller may have a longitudinal shape. The first fixing portion and the second fixing portion may be in the accessory such that a longitudinal direction of the first game controller fixed to the first fixing portion and a longitudinal direction of the second game controller fixed to the second fixing portion are parallel or approximately parallel to each other.

Based on the above, it is possible to detect an operation on the accessory in the state where longitudinal directions of the first game controller and the second game controller are directed in the same direction.

Further, the first fixing portion and the second fixing portion may be in the accessory such that longitudinal directions of the first fixing portion and the second fixing portion are on the same straight line or approximately the same straight line in the accessory.

Based on the above, it is possible to detect an operation on the accessory in the state where longitudinal directions of the first game controller and the second game controller are arranged on the same straight line.

Further, the game system may further comprise a game apparatus. The game apparatus comprises the computer configured to execute the game processing and a display screen configured to display a game screen generated based on a processing result of the computer. In this case, the accessory may further comprise a game apparatus fixing portion to which the game apparatus is attachably and detachably fixed.

Based on the above, it is possible to mount on the accessory a control apparatus for performing game processing and also perform game play while viewing a display device attached to the accessory.

Further, at least one of the first game controller and the second game controller further may comprise a first button. The accessory may further comprise a movable portion. The movable portion may comprise an operation portion and a first button pressing portion. The operation portion is operated by a hand of a user. The first button pressing portion moves toward the first button in accordance with an operation on the operation portion, thereby pressing the first button of the first game controller fixed to the first fixing portion or the first button of the second game controller fixed to the second fixing portion.

Based on the above, when an operation is performed using the accessory, it is also possible to perform an operation using a first button of the first game controller or the second game controller attached to the accessory.

Further, at least one of the first game controller and the second game controller may further comprise a second button. The movable portion may comprise a second button pressing portion. The second button pressing portion moves toward the second button in accordance with an operation on the operation portion, thereby pressing the second button of the first game controller fixed to the first fixing portion or the second button of the second game controller fixed to the second fixing portion.

Based on the above, based on an operation on a single operation section provided in the accessory, it is possible to perform operations on two operation buttons.

Further, when the operation portion is moved in a certain direction in accordance with an operation on the operation portion, the first button pressing portion may press the first button. When the operation portion is moved in a direction different from the certain direction in accordance with an operation on the operation portion, the second button pressing portion may press the second button.

Based on the above, based on the direction of an operation on a single operation section provided in the accessory, it is possible to perform an operation by distinguishing two operation buttons.

Further, in an exemplary configuration of an accessory according to the exemplary embodiment, to and from an accessory, a first game controller comprising a first gyro sensor and a second game controller comprising a second gyro sensor are attachable and detachable. The accessory comprises a first fixing portion and a second fixing portion. The first fixing portion fixes the first game controller so as to rotate about at least a certain axis. The second fixing portion fixes the second game controller.

Based on the above, a first game controller and a second game controller are attached to an accessory, whereby the first game controller is attached so as to rotate about at least a predetermined axis relative to the accessory. Thus, both controllers are attached to the accessory, whereby it is possible to easily extract a rotational action of the first game controller about the predetermined axis in the accessory. It is possible to perform game processing based on the content of the rotational action.

Further, the first fixing portion and the second fixing portion may be configured to be formed by folding at least one cardboard.

Based on the above, it is possible to assemble a first fixing portion and a second fixing portion of the accessory by folding a cardboard member.

Further, in another configuration of the game system according to the exemplary embodiment, a game system comprises a first game controller comprising a first gyro sensor, a second game controller comprising a second gyro sensor, and a computer configured to execute game processing. The game system further comprises a computer configured to: based on an output from the first gyro sensor of the first game controller, calculate a first value indicating an orientation of the first game controller; based on an output from the second gyro sensor of the second game controller, calculate a second value indicating an orientation of the second game controller; and calculate a difference value indicating a difference between the first value and the second value. The computer configured to execute the game processing executes a first game process based on the difference value, and executes a second game process different from the first game process based on the orientation of the first game controller or the orientation of the second game controller.

Based on the above, based on a difference value between a first value indicating an orientation of the first game controller and a second value indicating an orientation of the second game controller, it is possible to detect the content of an operation on an accessory. Thus, it is possible to improve the variety of operations using the orientation of the first game controller and the orientation of the second game controller. Further, it is possible to perform game processing not only based on the difference value but also based on the orientation of the first game controller or the orientation of the second game controller. Thus, it is possible to further improve the variety of operations using the orientation of the first game controller and the orientation of the second game controller.

Further, the game system may be carried out in the forms of a storage medium having stored therein a game program, a game apparatus, and a game method.

Further, in an exemplary configuration of a cardboard member according to the exemplary embodiment, a cardboard member can form an accessory to and from which a first game controller comprising a first gyro sensor and a second game controller comprising a second gyro sensor are attachable and detachable. The accessory comprises a first fixing portion and a second fixing portion. The first fixing portion fixes the first game controller so as to rotate about at least a certain axis. The second fixing portion fixes the second game controller. The cardboard member can integrally form the accessory comprising the first fixing portion and the second fixing portion, by folding the cardboard member.

Based on the above, a cardboard member is folded, whereby it is possible to configure an accessory to which a first game controller and a second game controller are attachable.

According to the exemplary embodiment, it is possible to improve the variety of operations using the orientation of a first game controller and the orientation of a second game controller.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 11 is a diagram showing a non-limiting example of the state where the main body apparatus 2, the left controller 3, and the right controller 4 are attached to the accessory 200;

FIG. 14 is a diagram showing a non-limiting example of a second state of the accelerator mechanism of the accessory 200;

FIG. 15 is a diagram showing a non-limiting example of a third state of the accelerator mechanism of the accessory 200;

FIG. 20 is a diagram showing a non-limiting example of a data area set in a DRAM 85 of the main body apparatus 2 in an exemplary embodiment.

DETAILED DESCRIPTION OF NON-LIMITING EXAMPLE EMBODIMENTS

Figure 1:
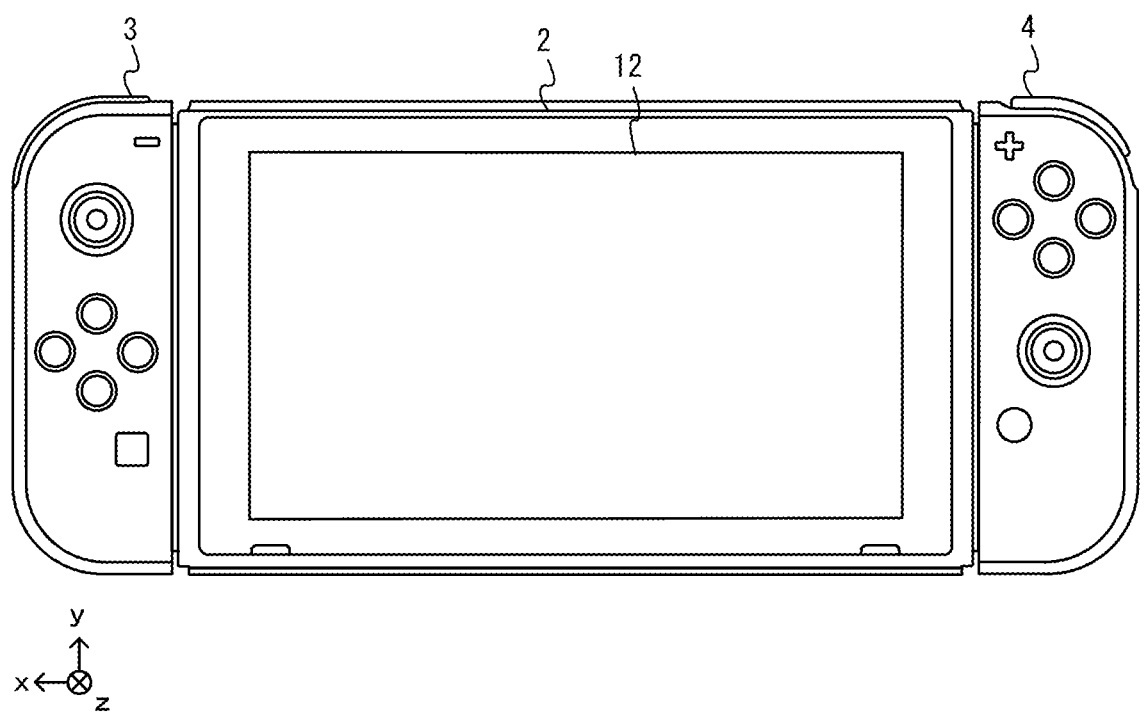
FIG. 1 is a diagram showing a non-limiting example of the state where a left controller 3 and a right controller 4 are attached to a main body apparatus 2.

A game system, a game program, a game apparatus, and a game processing method according to an exemplary embodiment are described below. A game system 1 according to the exemplary embodiment includes a main body apparatus (an information processing apparatus; which functions as a game apparatus main body in the exemplary embodiment) 2, a left controller 3, a right controller 4, and an accessory 200. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Further, the accessory 200 in the game system 1 can be used as an extension operation device or an operation tool by attaching controllers (e.g., the left controller 3 and the right controller 4) to the inside of the accessory 200. Hereinafter, first, the hardware configuration of the game system 1 according to the exemplary embodiment is described, and then, the control of the game system 1 according to the exemplary embodiment is described.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs. It should be noted that in the exemplary embodiment, the longitudinal direction of a main surface of the game system 1 is referred to as a "horizontal direction" (also as a "left-right direction"), the short direction of the main surface is referred to as a "vertical direction" (also as an "up-down direction"), and a direction perpendicular to the main surface is referred to as a depth direction (also as a "front-back direction"). Further, to facilitate the understanding of directions in the game system 1, three axial (xyz axes) directions are defined for the game system 1. Specifically, as shown in FIG. 1, in the game system 1, the depth direction of the display 12 from a front surface, on which the display 12 is provided, to a back surface is defined as a positive z-axis direction. In the horizontal direction perpendicular to the depth direction, the direction from the right to left (the direction from the attachment position of the right controller 4 to the attachment position of the left controller 3) is defined as a positive x-axis direction. In the up-down direction perpendicular to the depth direction and the horizontal direction, the direction upward along the display 12 is defined as a positive y-axis direction.

Figure 2:
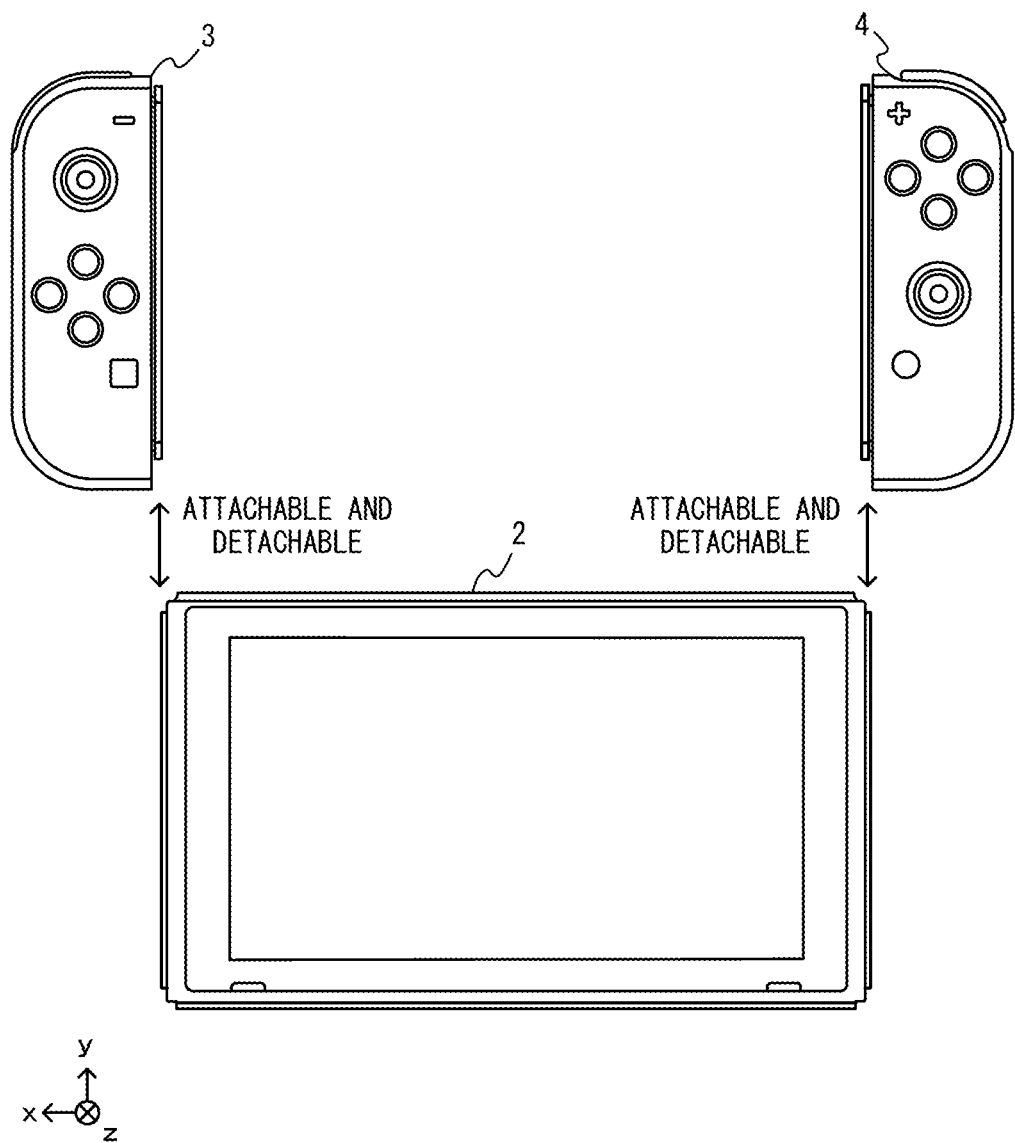
FIG. 2 is a diagram showing a non-limiting example of the state where each of the left controller 3 and the right controller 4 is detached from the main body apparatus 2.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller". Further, in the exemplary embodiment, two controllers (e.g., the left controller 3 and the right controller 4) are attached to an extension operation device (e.g., the accessory 200), whereby it is possible to control information processing (e.g., game processing) executed by the main body apparatus 2 by the user operating the extension operation device.

Figure 3:
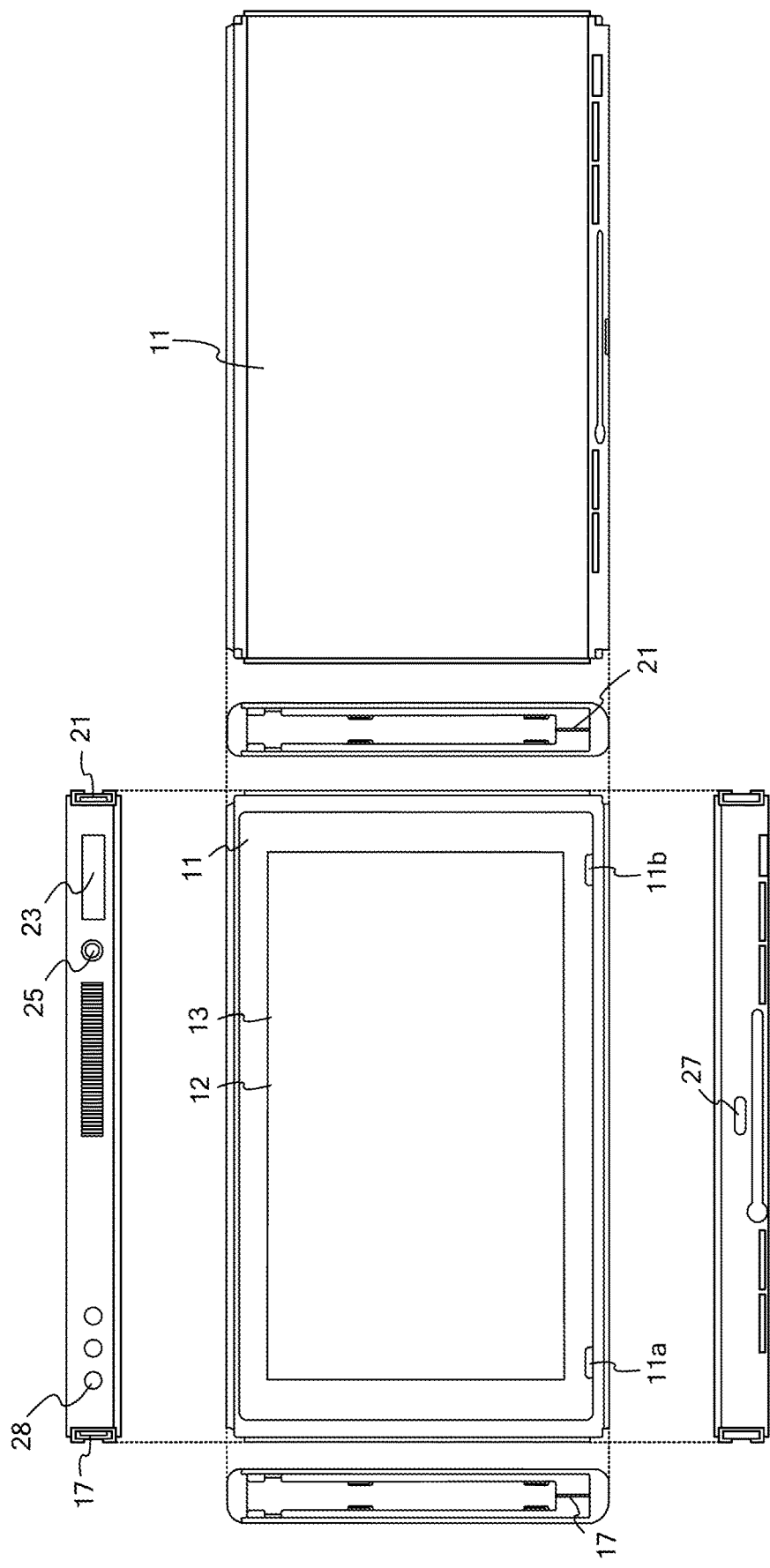
FIG. 3 is six orthogonal views showing a non-limiting example of the main body apparatus 2.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
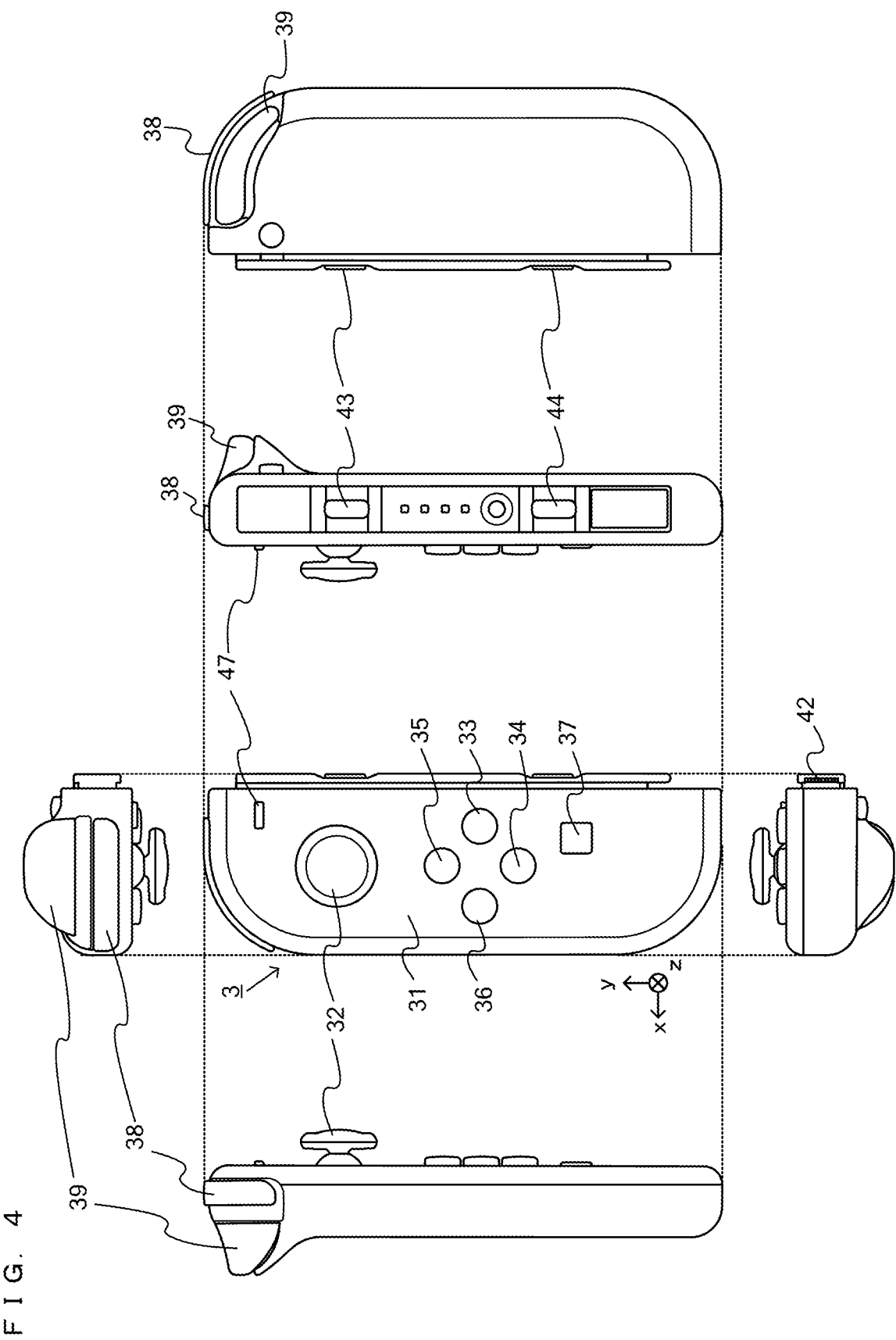
FIG. 4 is six orthogonal views showing a non-limiting example of the left controller 3.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
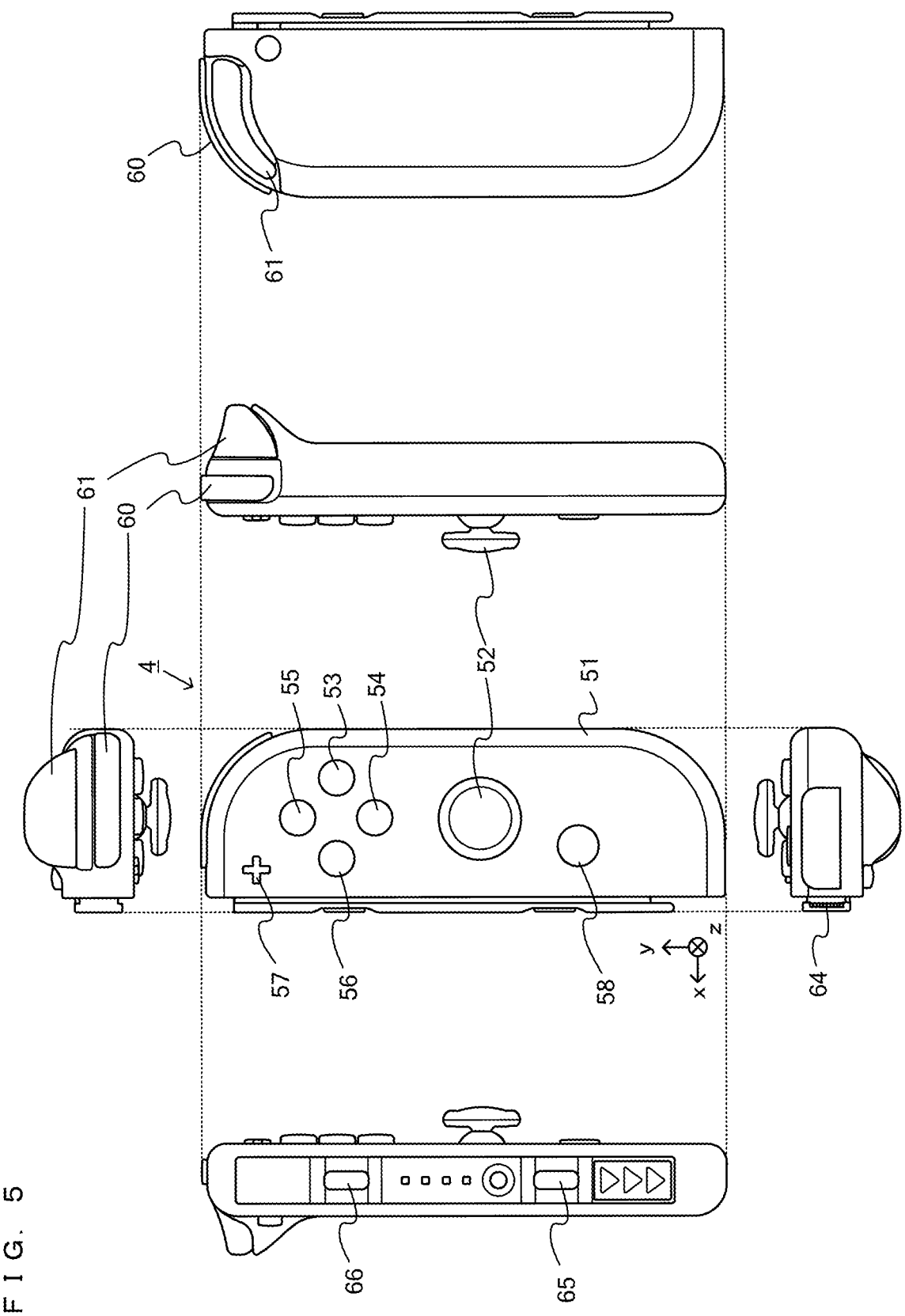
FIG. 5 is six orthogonal views showing a non-limiting example of the right controller 4.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
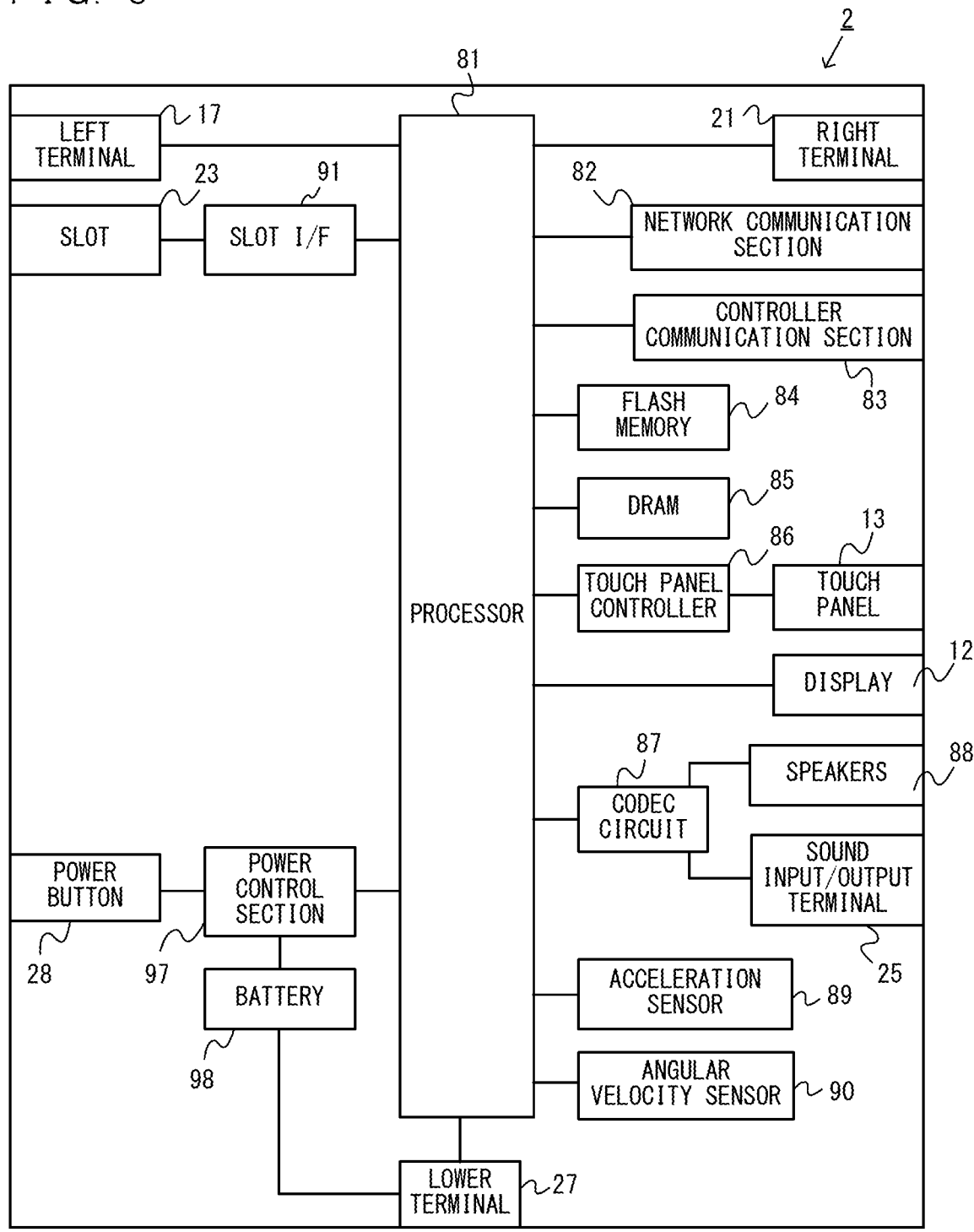
FIG. 6 is a block diagram showing a non-limiting example of the internal configuration of the main body apparatus 2.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. Based on a signal from the touch panel 13, the touch panel controller 86 generates, for example, data indicating the position where a touch input is provided. Then, the touch panel controller 86 outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

Further, the main body apparatus 2 includes an acceleration sensor 89. In the exemplary embodiment, the acceleration sensor 89 detects the magnitudes of accelerations along predetermined three axial (e.g., xyz axes shown in FIG. 1) directions. It should be noted that the acceleration sensor 89 may detect an acceleration along one axial direction or accelerations along two axial directions.

Further, the main body apparatus 2 includes an angular velocity sensor 90. In the exemplary embodiment, the angular velocity sensor 90 detects angular velocities about predetermined three axes (e.g., the xyz axes shown in FIG. 1). It should be noted that the angular velocity sensor 90 may detect an angular velocity about one axis or angular velocities about two axes.

The acceleration sensor 89 and the angular velocity sensor 90 are connected to the processor 81, and the detection results of the acceleration sensor 89 and the angular velocity sensor 90 are output to the processor 81. Based on the detection results of the acceleration sensor 89 and the angular velocity sensor 90, the processor 81 can calculate information regarding the motion and/or the orientation of the main body apparatus 2.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
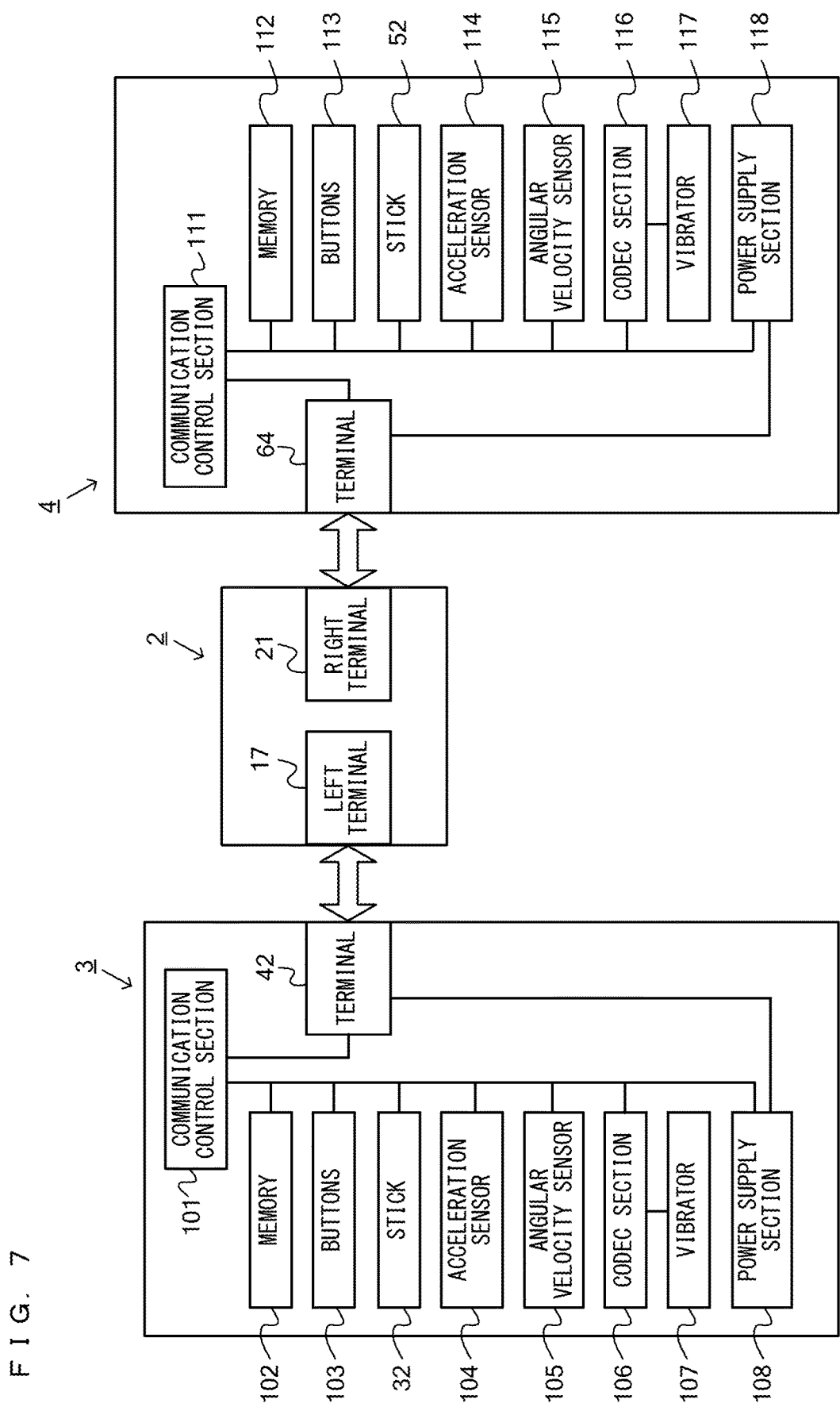
FIG. 7 is a block diagram showing non-limiting examples of the internal configurations of the main body apparatus 2, the left controller 3, and the right controller 4.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105). It should be noted that in the following description, the direction in which the left controller 3 rotates about an x-axis direction (see FIGS. 1, 2, and 4) is a pitch direction. The direction in which the left controller 3 rotates about a y-axis direction is a roll direction. The direction in which the left controller 3 rotates about a z-axis direction is a yaw direction.

The left controller 3 includes a vibrator 107 for giving notification to the user by a vibration. In the exemplary embodiment, the vibrator 107 is controlled by a command from the main body apparatus 2. That is, if receiving the above command from the main body apparatus 2, the communication control section 101 drives the vibrator 107 in accordance with the received command. Here, the left controller 3 includes a codec section 106. If receiving the above command, the communication control section 101 outputs a control signal corresponding to the command to the codec section 106. The codec section 106 generates a driving signal for driving the vibrator 107 from the control signal from the communication control section 101 and outputs the driving signal to the vibrator 107. Consequently, the vibrator 107 operates.

More specifically, the vibrator 107 is a linear vibration motor. Unlike a regular motor that rotationally moves, the linear vibration motor is driven in a predetermined direction in accordance with an input voltage and therefore can be vibrated at an amplitude and a frequency corresponding to the waveform of the input voltage. In the exemplary embodiment, a vibration control signal transmitted from the main body apparatus 2 to the left controller 3 may be a digital signal representing the frequency and the amplitude every unit of time. In another exemplary embodiment, the main body apparatus 2 may transmit information indicating the waveform itself. The transmission of only the amplitude and the frequency, however, enables a reduction in the amount of communication data. Additionally, to further reduce the amount of data, only the differences between the numerical values of the amplitude and the frequency at that time and the previous values may be transmitted, instead of the numerical values. In this case, the codec section 106 converts a digital signal indicating the values of the amplitude and the frequency acquired from the communication control section 101 into the waveform of an analog voltage and inputs a voltage in accordance with the resulting waveform, thereby driving the vibrator 107. Thus, the main body apparatus 2 changes the amplitude and the frequency to be transmitted every unit of time and thereby can control the amplitude and the frequency at which the vibrator 107 is to be vibrated at that time. It should be noted that not only a single amplitude and a single frequency, but also two or more amplitudes and two or more frequencies may be transmitted from the main body apparatus 2 to the left controller 3. In this case, the codec section 106 combines waveforms indicated by the plurality of received amplitudes and frequencies and thereby can generate the waveform of a voltage for controlling the vibrator 107.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3. It should be noted that the main body apparatus 2 can calculate information regarding the motion and/or the orientation of the right controller 4 based on operation data (specifically, the detection results of the acceleration sensor 114 and the angular velocity sensor 115). Further, in the following description, the direction in which the right controller 4 rotates about an x-axis direction (see FIGS. 1, 2, and 5) is a pitch direction. The direction in which the right controller 4 rotates about a y-axis direction is a roll direction. The direction in which the right controller 4 rotates about a z-axis direction is a yaw direction.

Further, the right controller 4 includes a vibrator 117 and a codec section 116. The vibrator 117 and the codec section 116 operate similarly to the vibrator 107 and the codec section 106, respectively, of the left controller 3. That is, in accordance with a command from the main body apparatus 2, the communication control section 111 causes the vibrator 117 to operate, using the codec section 116.

The right controller 4 includes a power supply section 118. The power supply section 118 has a function similar to that of the power supply section 108 of the left controller 3 and operates similarly to the power supply section 108.

Figure 8:
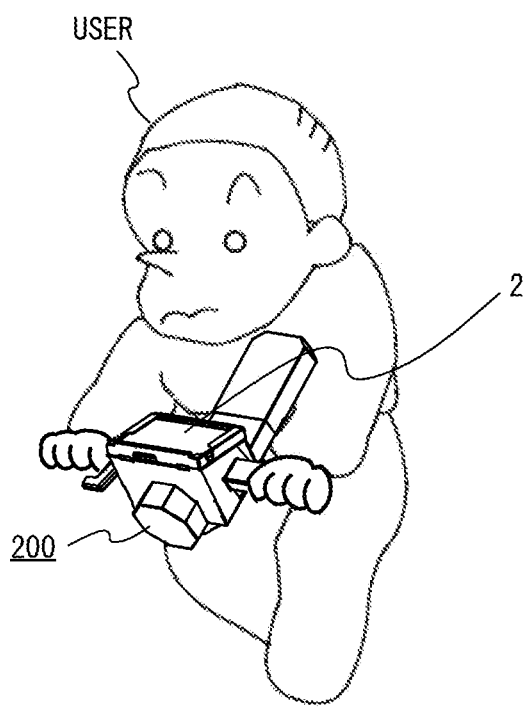
FIG. 8 is a diagram showing a non-limiting example of the state where a user performs a game operation by attaching an accessory 200.

Next, with reference to FIG. 8, a description is given of an operation using the accessory 200, which is an example of the extension operation device. FIG. 8 is a diagram showing an example of the state where a user performs a game operation by attaching the accessory 200. In the exemplary embodiment, the main body apparatus 2, the left controller 3, and the right controller 4 can be attached to the accessory 200. Based on operation data transmitted from the left controller 3 and the right controller 4 attached to the accessory 200 to the main body apparatus 2, a process corresponding to the content of an operation on the accessory 200 is executed. Here, although the details will be described later, the content of an operation on the accessory 200 is detected based on operations on the operation buttons provided in the left controller 3 and the right controller 4 and the orientations or the motions of the left controller 3 and the right controller 4. Thus, the accessory 200 does not need to have an electrical structure such as an electronic circuit for detecting the content of an operation performed by the user and transmitting the detection result to the main body apparatus 2. Thus, according to the exemplary embodiment, it is possible to simplify the configuration of the accessory 200, which is an example of the extension operation device.

For example, in the exemplary embodiment, as shown in FIG. 8, while holding portions (a left controller supporting portion 203 and a right controller supporting portion 204 described later) provided at both ends (on the left and right) of the accessory 200, the user uses the accessory 200 in the state where the extremity of a supporting portion (a supporting portion 201 described later) provided between both holding portions abuts a front portion of the torso of the user's body. Then, the user performs an operation using the accessory 200 by tilting the entirety of the accessory 200, twisting one of the holding portions (e.g., the right controller supporting portion 204 held by the right hand of the user), moving both holding portions as if operating a steering wheel, or operating operation sections (a blinker operation section 205, a brake operation section 206, and a starter operation section 207 described later) provided in the accessory 200. Typically, the accessory 200 can simulate a motorbike, and the user can perform the operation of performing the simulated driving of the motorbike using the accessory 200. Here, the up, down, left, and right directions of the accessory 200 are defined as directions viewed from the user based on the state where the user uses the accessory 200. That is, in a case where the user uses the accessory 200 in the state where the extremity of the supporting portion abuts the front portion of the torso of the user's body, the direction in which a holding portion (the left controller supporting portion 203 described later) capable of being held by the left hand is provided is the left direction of the accessory 200. The direction in which a holding portion (the right controller supporting portion 204 described later) capable of being held by the right hand is provided is the right direction of the accessory 200.

To an upper surface of a main body portion (a main body portion 202 described later) of the accessory 200, the main body apparatus 2 is attached. Then, in accordance with an operation using the accessory 200 as described above, a player object placed in a virtual space performs an action, and an image of the virtual space reflecting the action of the player object is displayed on the display 12 of the main body apparatus 2.

For example, when the user operates an operation section provided in the accessory 200, then in accordance with the operation on the operation section, an operation button (the first L-button 38 or the ZL-button 39) of the left controller 3 attached to the inside of the left controller supporting portion 203, or an operation button (the first R-button 60 or the ZR-button 61) of the right controller 4 attached to the inside of the right controller supporting portion 204 is pressed. Such a pressing operation on the operation button is detected, whereby it is estimated that the user operating the accessory 200 operates an operation section. Then, in accordance with the operation section on which the operation is estimated, the player object also performs an action in the virtual space.

Here, each of the left controller 3 and the right controller 4 attached to the accessory 200 includes the inertial sensors (the acceleration sensor and the angular velocity sensor). Thus, it is possible to calculate the orientations and/or the motions of the left controller 3 and the right controller 4 (i.e., the orientation and/or the motion of the accessory 200) using the detection results of the inertial sensors. In the exemplary embodiment, in accordance with such an orientation and/or a motion of the accessory 200, it is possible to control the action of the player object.

For example, when the user rotates the right controller supporting portion 204 (see FIGS. 9 to 11) that the user holds with their right hand as if twisting an accelerator, the right controller 4 attached to the inside of the right controller supporting portion 204 roll-rotates. Such a motion of the right controller 4 is detected, whereby it is estimated that the user operating the accessory 200 performs an operation as if twisting the accelerator. Then, the player object also moves in the virtual space at a velocity corresponding to an estimated accelerator position. Further, when the user performs the operation of directing the entirety of the accessory 200 upward (the operation of running in the state where the front wheel of the motorbike is off the ground; hereinafter referred to as a "wheelie operation"), the left controller 3 attached to the inside of the left controller supporting portion 203 (see FIGS. 9 to 11) roll-rotates. Such a motion of the roll rotation of the left controller 3 is detected, whereby it is estimated that the user operating the accessory 200 performs an operation as if performing a wheelie. Then, the player object also performs a wheelie action in the virtual space in accordance with an estimated change in the orientation. Further, when the user performs the operation of moving the left controller supporting portion 203 and the right controller supporting portion 204 that the user holds with their left and right hands as if turning the steering wheel, the left controller 3 attached to the inside of the left controller supporting portion 203 yaw-rotates. Such a motion of the yaw rotation of the left controller 3 is detected, whereby it is estimated that the user operating the accessory 200 performs the operation of turning the steering wheel. Then, the player object also changes its moving direction in the virtual space in accordance with an estimated change in the direction. Further, when the user performs the operation of tilting the entirety of the accessory 200 to the left and right, the left controller 3 attached to the inside of the left controller supporting portion 203 pitch-rotates. Such a motion of the pitch rotation of the left controller 3 is detected, whereby it is estimated that the user operating the accessory 200 performs the operation of falling over to the left and right. Then, the player object also tilts and/or changes its moving direction in the virtual space in accordance with an estimated tilting change.

It should be noted that in the action or the orientation of the player object to be changed in accordance with the orientation of the left controller 3, another change may occur in accordance with the state (e.g., the moving velocity or the accelerator position) of the player object moving in the virtual space. For example, the wheelie action may be able to be performed only while the player object is moving at a predetermined moving velocity or more in the virtual space (e.g., in the state where the accelerator position is equal to or greater than a predetermined value). In this case, even when the user performs the wheelie operation, but when the condition under which the player object performs the wheelie action is not satisfied, the direction in which the player object is directed may be simply changed to the up direction in the virtual space without performing the wheelie action.

Further, in the above example, the motion of the roll rotation of the left controller 3 is detected, whereby it is estimated that the user operating the accessory 200 performs an operation as if performing a wheelie. Alternatively, another motion may be detected, thereby detecting the wheelie operation. For example, the motion of the main body apparatus 2, attached to the accessory 200, rotating in the pitch direction (the direction in which the main body apparatus 2 rotates about an x-axis direction shown in FIG. 1) may be detected, thereby estimating that the user operating the accessory 200 performs an operation as if performing a wheelie. In this case, the rotation in the pitch direction of the main body apparatus 2 may be detected using angular velocities detected by the angular velocity sensor 90, which is provided in the main body apparatus 2. As another example, the roll rotation of the right controller 4 attached to the accessory 200 may be detected, thereby estimating that the user operating the accessory 200 performs an operation as if performing a wheelie. In this case, under the condition that the difference in roll rotation between the left controller 3 and the right controller 4 is less than or equal to a predetermined value, the wheelie operation can be detected based on the roll rotation of the right controller 4.

Further, in the above example, an example has been described where the wheelie operation, the operation of turning the steering wheel, and the operation of tilting the entirety of the accessory 200 to the left and right are performed in addition to the accelerator operation. Alternatively, at least one of the wheelie operation, the operation of turning the steering wheel, and the operation of tilting the entirety of the accessory 200 to the left and right may be implemented in addition to the accelerator operation.

As described above, the player object that performs an action in accordance with an operation using the accessory 200 is displayed on the display 12 of the main body apparatus 2. Thus, the user operating the accessory 200 enjoys a game by viewing the display 12 of the main body apparatus 2, which is provided on an upper surface of the accessory 200 (the upper surface of the main body portion 202). However, the viewpoint from which the player object on the display 12 is displayed may be placed at any position in the virtual space. As a first example, a virtual space image obtained by viewing the player object from behind the player object may be displayed on the above display device. As a second example, a virtual space image from a first-person viewpoint of the player object may be displayed on the above display device. As a third example, a virtual space image obtained by viewing the player object from the front of the player object may be displayed on the above display device. Here, depending on the viewpoint placed in the virtual space and the direction of the line of sight, it may be difficult for the user to understand the motion of the player object relative to the motion of the user themselves. However, a part or the action direction of the player object performing an action in response to an operation using the accessory 200 is set in accordance with the viewpoint and the direction of the line of sight, whereby it is possible to provide realistic game play. Further, vibrations corresponding to the game situation are imparted to the left controller 3 and/or the right controller 4. Thus, the vibrations of the left controller 3 and/or the right controller 4 are transmitted via the left controller supporting portion 203 and/or the right controller supporting portion 204. Thus, it is also possible to cause the user, performing an operation while holding the left controller supporting portion 203 and the right controller supporting portion 204, to perceive the vibrations. Thus, it is possible to provide more realistic game play.

Figure 9:
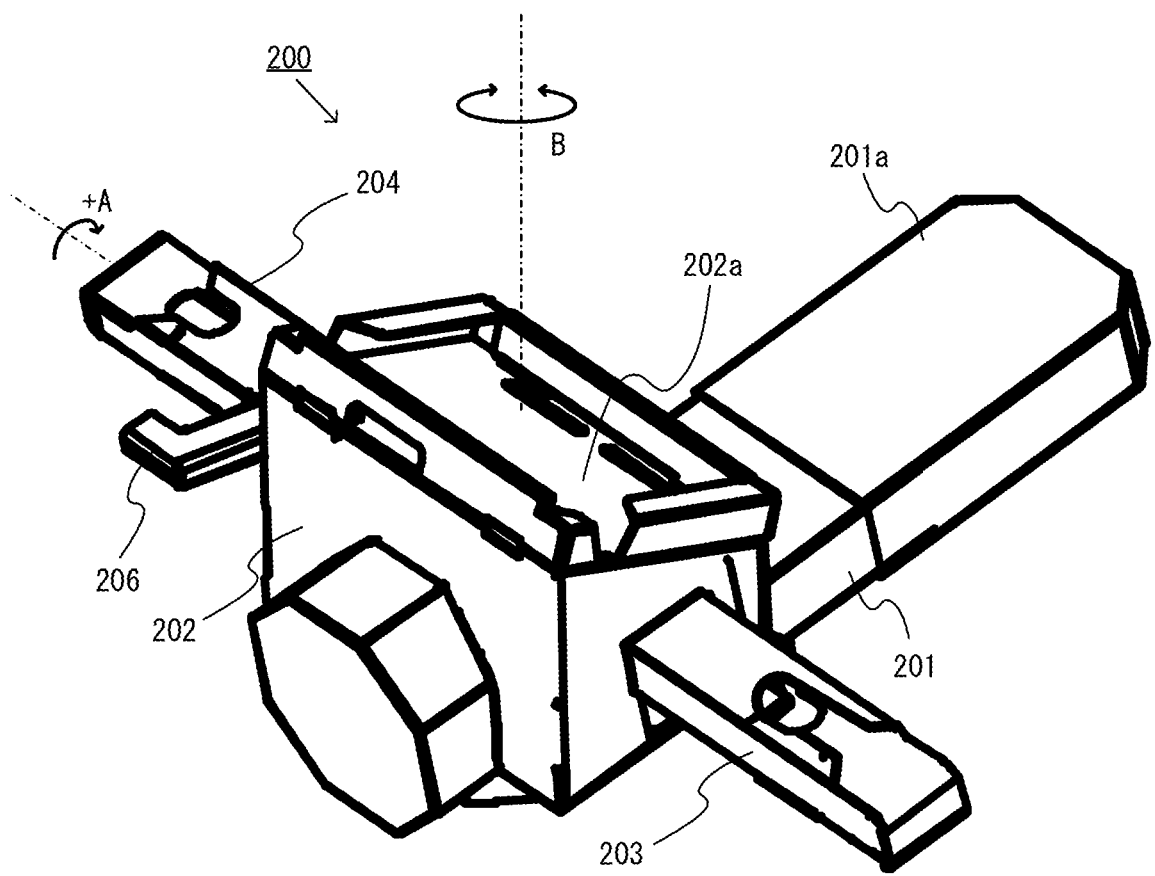
FIG. 9 is a perspective view showing a non-limiting example of the external appearance of the accessory 200.
Figure 10:
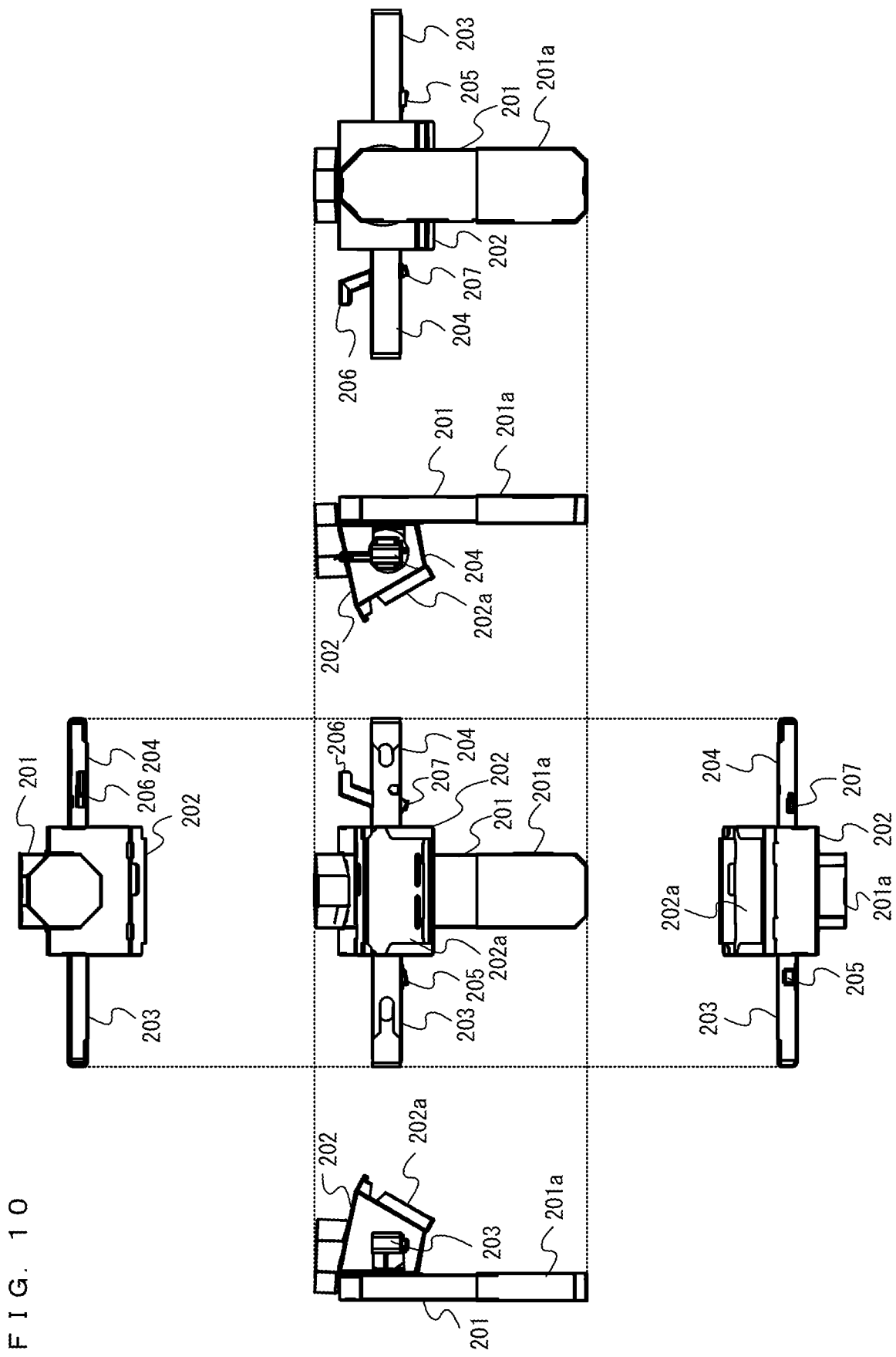
FIG. 10 is six orthogonal views showing a non-limiting example of the external appearance of the accessory 200.
Figure 12:
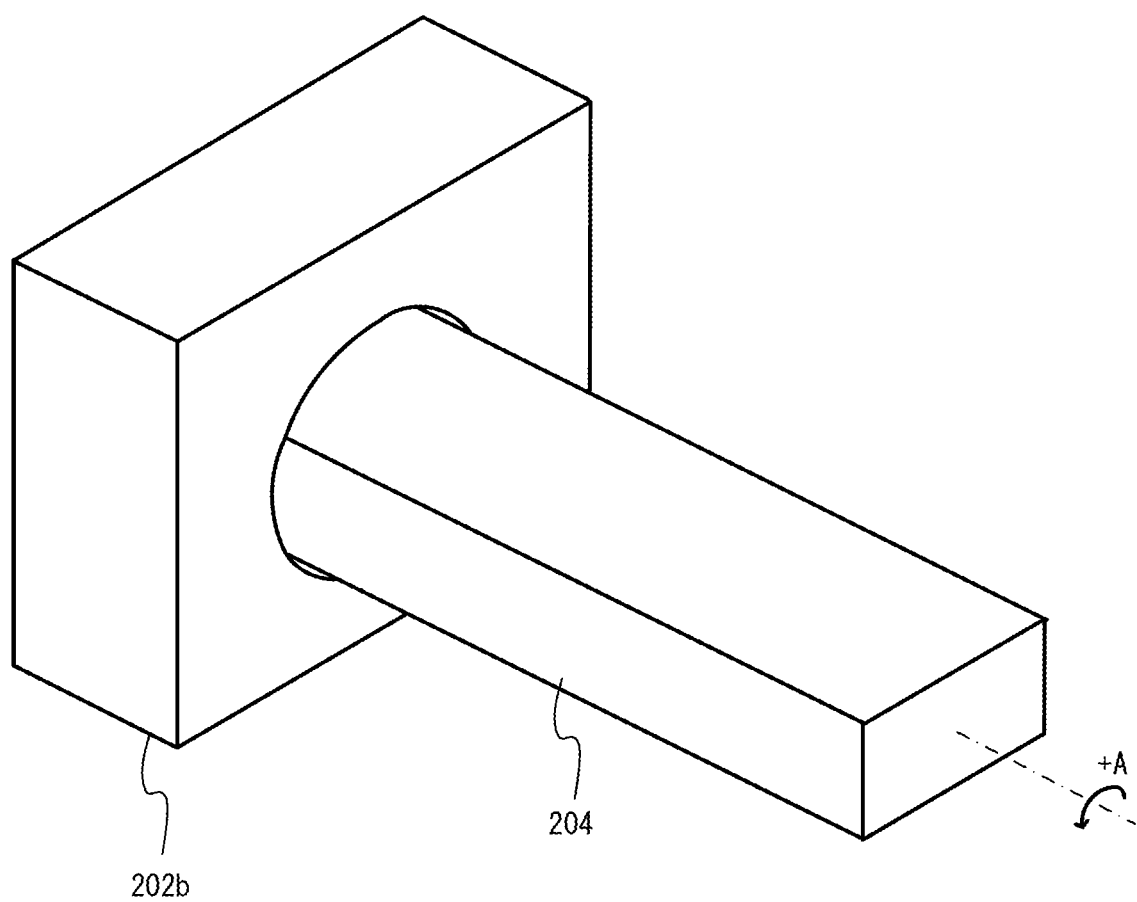
FIG. 12 is a diagram showing a non-limiting example of an accelerator mechanism of the accessory 200.
Figure 13:
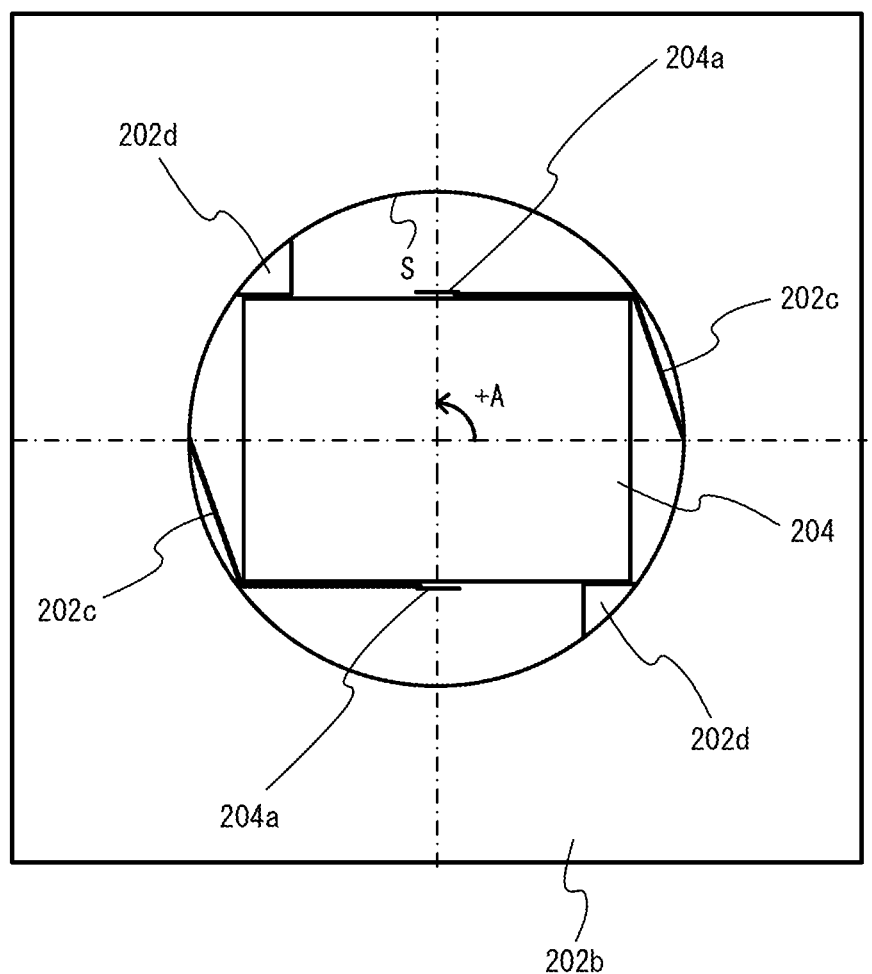
FIG. 13 is a diagram showing a non-limiting example of a first state of the accelerator mechanism of the accessory 200.
Figure 16:
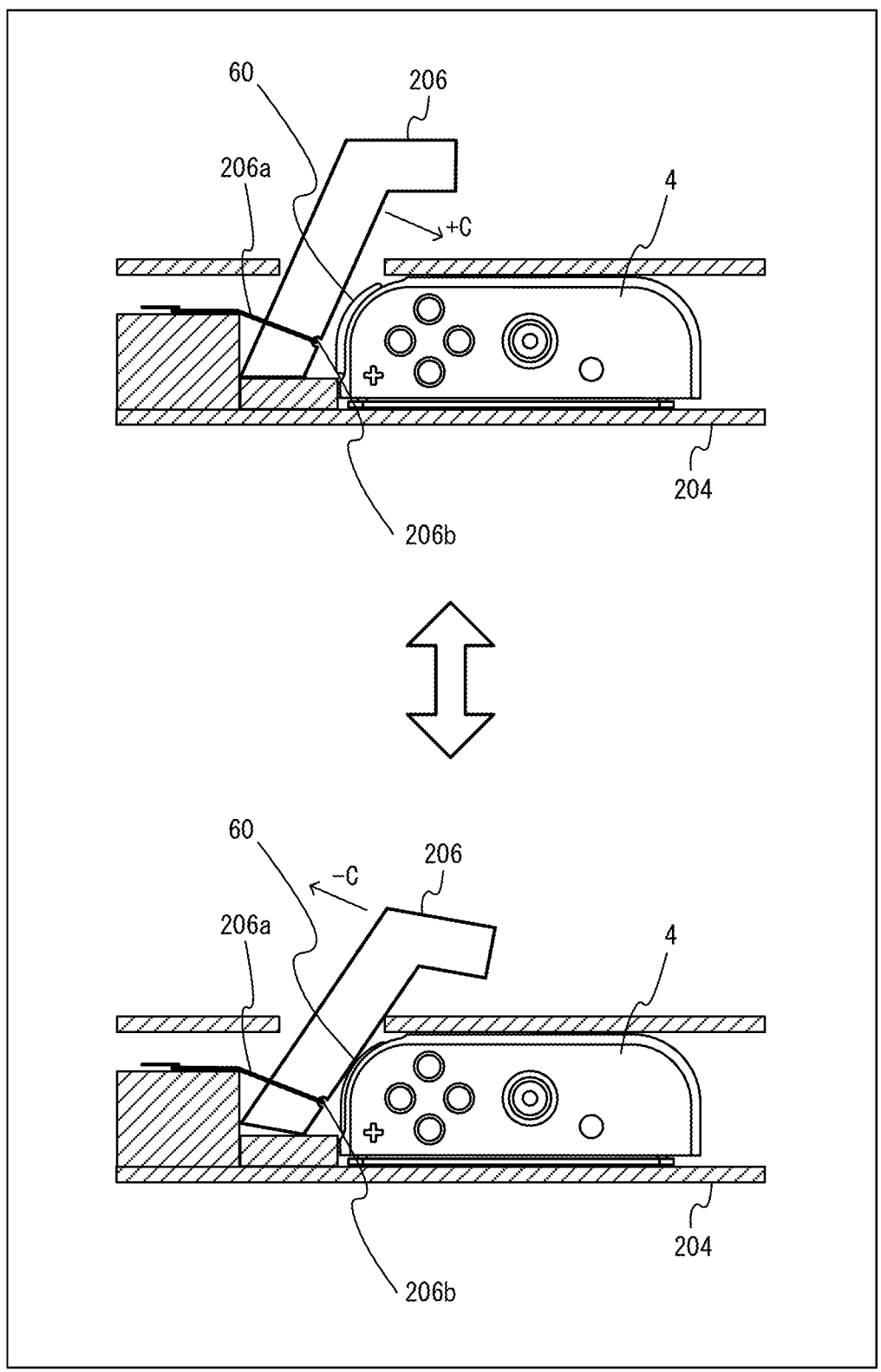
FIG. 16 is a diagram showing a non-limiting example of a brake mechanism of the accessory 200.
Figure 17:
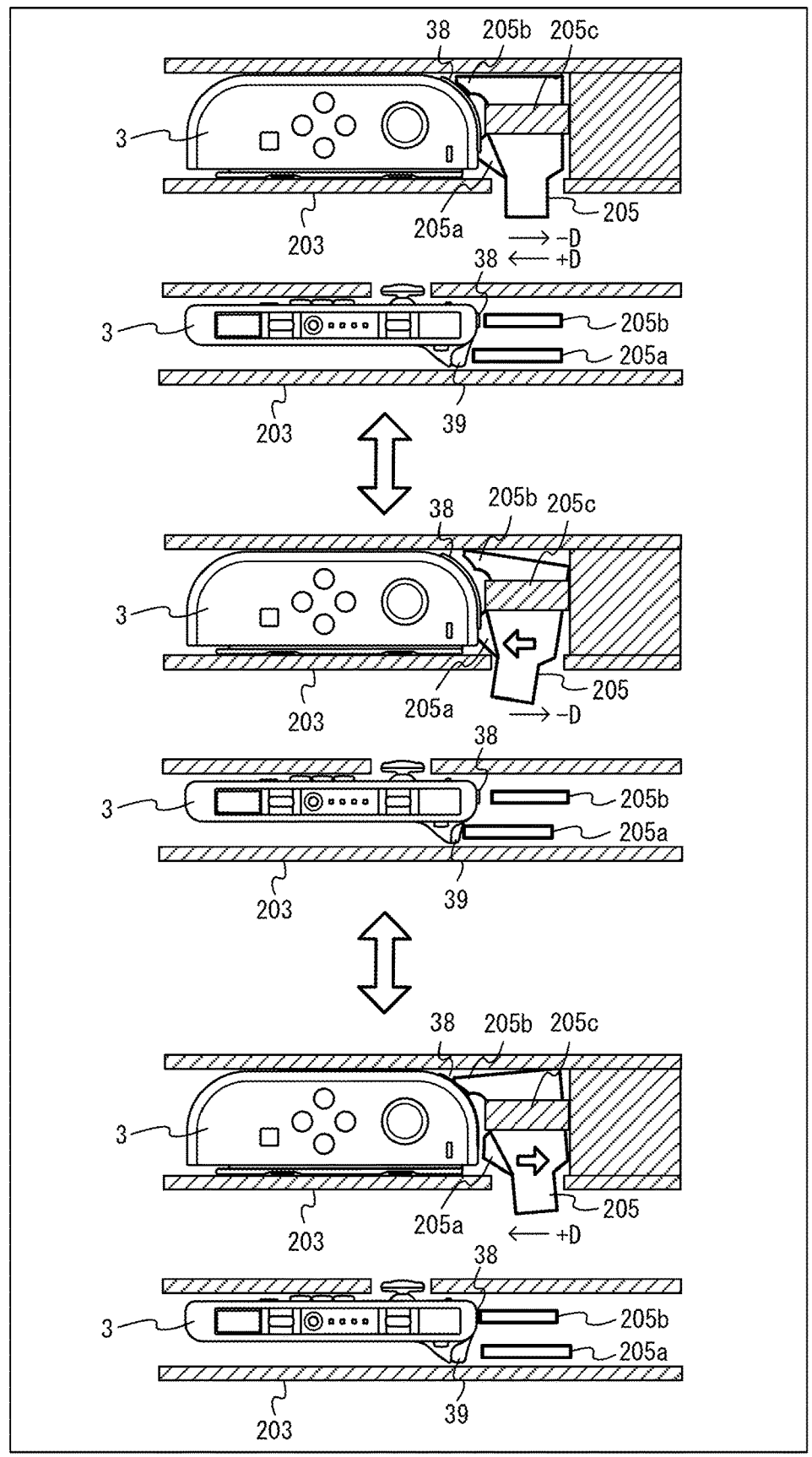
FIG. 17 is a diagram showing a non-limiting example of a blinker mechanism of the accessory 200.

Next, with reference to FIGS. 9 to 17, a description is given of the accessory 200, which is an example of the extension operation device. It should be noted that FIG. 9 is a perspective view showing an example of the external appearance of the accessory 200. FIG. 10 is six orthogonal views showing an example of the external appearance of the accessory 200. FIG. 11 is a diagram showing an example of the state where the main body apparatus 2, the left controller 3, and the right controller 4 are attached to the accessory 200. FIG. 12 is a diagram showing an example of an accelerator mechanism of the accessory 200. FIG. 13 is a diagram showing an example of a first state of the accelerator mechanism of the accessory 200. FIG. 14 is a diagram showing an example of a second state of the accelerator mechanism of the accessory 200. FIG. 15 is a diagram showing an example of a third state of the accelerator mechanism of the accessory 200. FIG. 16 is a diagram showing an example of a brake mechanism of the accessory 200. FIG. 17 is a diagram showing an example of a blinker mechanism of the accessory 200.

In FIGS. 9 to 11, generally, the accessory 200 includes a supporting portion 201, a main body portion 202, a left controller supporting portion 203, and a right controller supporting portion 204. The entirety of the accessory 200 has a shape representing a front portion of a motorbike including a steering wheel. The user can perform the operation of performing the simulated driving of the motorbike using the accessory 200 by causing the back end of the supporting portion 201 to abut a front portion of the torso of the user while holding the left controller supporting portion 203 and the right controller supporting portion 204 on the left and right with their left and right hands. The main body portion 202 is attached to an upper surface of the supporting portion 201 so as to rotate in a B direction shown in the figures. Then, the left controller supporting portion 203 is provided on a left side surface of the main body portion 202 by inserting the left controller supporting portion 203, and the right controller supporting portion 204 is provided on a right side surface of the main body portion 202 by inserting the right controller supporting portion 204.

The supporting portion 201 is a plate-like member of which the front-back direction is its longitudinal direction. On a front upper surface of the supporting portion 201, a shaft portion (not shown) to be inserted into the main body portion 202 is provided standing in the up direction. To a back end portion of the supporting portion 201, an extension portion 201a for adjusting the length in the longitudinal direction of the supporting portion 201 can be attached. When the extension portion 201a is attached to the back end portion of the supporting portion 201, the length in the longitudinal direction becomes long. Thus, the distances from the back end of the accessory 200 to the main body portion 202, the left controller supporting portion 203, and the right controller supporting portion 204 become long. Thus, the user detaches and attaches the extension portion 201a from and to the supporting portion 201 and thereby can adjust the length in the front-back direction of the accessory 200 in accordance with the build of the user themselves.

The main body portion 202 is rotationally provided in the shaft portion provided in the supporting portion 201 and is supported so as to rotate in the B direction shown in the figures on the front upper surface of the supporting portion 201. On an upper surface of the main body portion 202, a main body apparatus fixing portion 202a is formed, to which the main body apparatus 2 is attachably and detachably fixed. The main body apparatus fixing portion 202a can fix the main body apparatus 2 to the upper surface of the main body portion 202 by clamping up, down, left, and right end portions of the main body apparatus 2. Thus, the main body apparatus fixing portion 202a fixes the main body apparatus 2 such that the display 12 of the main body apparatus 2 is an upper surface, whereby the user can view an image displayed on the display 12 while operating the accessory 200.

Further, to the left side surface of the main body portion 202, the left controller supporting portion 203 is laterally provided on and fixed to the left side surface such that the longitudinal direction of the left controller supporting portion 203 is the left direction. Meanwhile, to the right side surface of the main body portion 202, the right controller supporting portion 204 is laterally provided on the right side surface such that the longitudinal direction of the right controller supporting portion 204 is the right direction. That is, the left controller supporting portion 203 is provided on one side of the main body portion 202, and the right controller supporting portion 204 is provided on the other side of the main body portion 202. Thus, the left controller supporting portion 203 and the right controller supporting portion 204 move integrally with the motion of the main body portion 202. When the main body portion 202 rotates in the B direction shown in the figures, the left controller supporting portion 203 and the right controller supporting portion 204 also rotate integrally in the B direction shown in the figures. Further, the left controller supporting portion 203 and the right controller supporting portion 204 are provided in the main body portion 202 such that the longitudinal direction of the left controller supporting portion 203 and the longitudinal direction of the right controller supporting portion 204 are on approximately the same straight line or are left and right directions approximately parallel to each other. Here, as will be apparent later, the right controller supporting portion 204 is provided on the right side surface of the main body portion 202 by inserting the right controller supporting portion 204 so as to rotate about a long axis, which is the longitudinal direction (an A direction shown in the figures). Thus, the right controller supporting portion 204 can roll-rotate in the A direction shown in the figures relative to the left controller supporting portion 203 or the main body portion 202.

To the inside of the left controller supporting portion 203, the left controller 3 is detachably attached. The length in the up-down direction of an inner space of the left controller supporting portion 203 is almost the same as the maximum thickness (the maximum length in a z-axis direction shown in FIG. 1) of the left controller 3, and the length in the left-right direction of the left controller supporting portion 203 is almost the same as the maximum width in the left-right direction (the maximum length in the x-axis direction shown in FIG. 1) of the left controller 3. Thus, the left controller 3 can be inserted into the inner space of the left controller supporting portion 203 and fixed such that the longitudinal direction of the left controller supporting portion 203 coincides with the longitudinal direction of the left controller 3. For example, as shown in FIG. 11, the left controller 3 can be attached to the left controller supporting portion 203 such that a main surface (a surface formed further in a negative z-axis direction in FIG. 4) of the left controller 3 is in the up direction, and an upper side surface (a surface further in a positive y-axis direction in FIG. 4) of the left controller 3 is in the right direction, which is on the main body portion 202 side. Thus, the left controller 3 attached to the left controller supporting portion 203 is attached to the accessory 200 such that the positive x-axis direction of the left controller 3 is the front direction of the accessory 200, the positive y-axis direction of the left controller 3 is the right direction of the accessory 200, and the positive z-axis direction of the left controller 3 is the down direction of the accessory 200. Then, when a front portion of the accessory 200 is brought up, or the front portion of the accessory 200 is brought down, the left controller 3 attached to the left controller supporting portion 203 rotates in the roll direction. When the main body portion 202 is caused to rotate in the B direction shown in the figures as if turning a steering wheel, the left controller 3 attached to the left controller supporting portion 203 rotates in the yaw direction. When the entirety of the accessory 200 is tilted to the left and right, the left controller 3 attached to the left controller supporting portion 203 rotates in the pitch direction. It should be noted that a part of the left controller 3 attached to the left controller supporting portion 203 may be exposed to outside. For example, the analog stick 32 and the like may be exposed on an upper surface of the left controller supporting portion 203.

The left controller supporting portion 203 includes a blinker operation section 205. The blinker operation section 205 is provided on the main body portion 202 side on a back side surface (a side surface on the side where the user operates the accessory 200) of the left controller supporting portion 203 and can be operated by the left thumb and the like of the user holding the left controller supporting portion 203. Specifically, the blinker operation section 205 includes an operation piece for moving to the left and right in accordance with a user operation. Then, as will be apparent later, in the blinker operation section 205, it is possible to selectively perform a pressing operation on one of the first L-button 38 and the ZL-button 39 of the left controller 3 by moving the operation piece to the left and right.

To the inside of the right controller supporting portion 204, the right controller 4 is detachably attached. The length in the up-down direction of an inner space of the right controller supporting portion 204 is almost the same as the maximum thickness (the maximum length in the z-axis direction shown in FIG. 1) of the right controller 4, and the length in the left-right direction of the right controller supporting portion 204 is almost the same as the maximum width in the left-right direction (the maximum length in the x-axis direction shown in FIG. 1) of the right controller 4. Thus, the right controller 4 can be inserted into the inner space of the right controller supporting portion 204 and fixed such that the longitudinal direction of the right controller supporting portion 204 coincides with the longitudinal direction of the right controller 4. For example, as shown in FIG. 11, the right controller 4 can be attached to the right controller supporting portion 204 such that a main surface (a surface formed further in a negative z-axis direction in FIG. 5) of the right controller 4 is in the up direction, and an upper side surface (a surface further in a positive y-axis direction in FIG. 5) of the right controller 4 is in the left direction, which is on the main body portion 202 side. Thus, the right controller 4 attached to the right controller supporting portion 204 is attached to the accessory 200 such that the positive x-axis direction of the right controller 4 is the back direction of the accessory 200, the positive y-axis direction of the right controller 4 is the left direction of the accessory 200, and the positive z-axis direction of the right controller 4 is the down direction of the accessory 200. Then, when the right controller supporting portion 204 is operated so as to rotate in the A direction shown in the figures, the right controller 4 attached to the right controller supporting portion 204 rotates in the roll direction. Further, when the front portion of the accessory 200 is brought up, or the front portion of the accessory 200 is brought down, the right controller 4 attached to the right controller supporting portion 204 rotates in the roll direction. When the main body portion 202 is caused to rotate in the B direction shown in the figures as if turning a steering wheel, the right controller 4 attached to the right controller supporting portion 204 rotates in the yaw direction and/or the pitch direction in accordance with the rotational angle of the right controller supporting portion 204 in the A direction shown in the figures. When the entirety of the accessory 200 is tilted to the left and right, the right controller 4 attached to the right controller supporting portion 204 rotates in the yaw direction and/or the pitch direction in accordance with the rotational angle of the right controller supporting portion 204 in the A direction shown in the figures. It should be noted that a part of the right controller 4 attached to the right controller supporting portion 204 may be exposed to outside. For example, the analog stick 52, the "+" button 57, and the like may be exposed on an upper surface of the right controller supporting portion 204.

The right controller supporting portion 204 includes a brake operation section 206 and a starter operation section 207. The brake operation section 206 is provided on the main body portion 202 side on a front side surface (a surface on the opposite side opposed to a side surface on the side where the user operates the accessory 200) of the right controller supporting portion 204 and can be operated by the right index finger or the like of the user holding the right controller supporting portion 204. Specifically, the brake operation section 206 includes an operation piece for moving to the near side in accordance with a user operation. Then, as will be apparent later, in the brake operation section 206, it is possible to perform a pressing operation on the first R-button 60 of the right controller 4 by moving the operation piece to the near side. Further, the starter operation section 207 is provided on the main body portion 202 side of a back side surface (the side surface on the side where the user operates the accessory 200) of the right controller supporting portion 204 and can be operated by the right thumb and the like of the user holding the right controller supporting portion 204. Specifically, the starter operation section 207 includes an operation piece capable of being pressed (subjected to a push-in operation) in accordance with a user operation. Then, in the starter operation section 207, it is possible to perform a pressing operation on the ZR-button 61 of the right controller 4 by pressing (pushing in) the operation piece.

Next, with reference to FIGS. 12 to 15, a description is given of an accelerator mechanism provided in the accessory 200. As described above, the right controller supporting portion 204 is provided by inserting the right controller supporting portion 204 so as to rotate in the A direction shown in the figures relative to the main body portion 202. As shown in FIG. 12, a bearing portion 202b for supporting the right controller supporting portion 204 so as to rotate is provided within the main body portion 202. The right controller supporting portion 204 can rotate in the A direction shown in the figures along a cylindrical inner surface S of the bearing portion 202b.

As shown in FIG. 13, the right controller supporting portion 204 is biased in an −A direction shown in the figures (e.g., a clockwise direction when the main body portion 202 is viewed from a right end portion of the right controller supporting portion 204) about the axis of the bearing portion 202b. For example, the right controller supporting portion 204 is biased in the −A direction shown in the figures by tension stress caused by elastic members 202c, which are provided in a stretched manner between the right controller supporting portion 204 and the bearing portion 202b. In the example shown in FIG. 13, on side surfaces of the right controller supporting portion 204, a plurality of elastic member hook portions 204a are provided, to which the elastic members 202c (e.g., rubber bands) are hooked. Then, one ends of the plurality of elastic members 202c are fixed to the cylindrical inner surface S of the bearing portion 202b, and the other ends of the plurality of elastic members 202c are hooked to the elastic member hook portions 204a such that the right controller supporting portion 204 is biased in the −A direction shown in the figures.

Further, on the cylindrical inner surface S of the bearing portion 202b, rotation restriction portions 202d are provided, which stop the rotational action of the right controller supporting portion 204. For example, the rotation restriction portions 202d are formed of protruding portions protruding from the cylindrical inner surface S of the bearing portion 202b. Consequently, when the side surfaces of the right controller supporting portion 204 rotation along the cylindrical inner surface S of the bearing portion 202b abut the rotation restriction portions 202d, the rotation of the right controller supporting portion 204 stops at the position of the abutment. Thus, when the right controller supporting portion 204 rotates in the −A direction shown in the figures by the biasing of the elastic members 202c, the rotation stops at the position where the side surfaces of the right controller supporting portion 204 and the rotation restriction portions 202d abut each other. The position of the stop is an initial position of the right controller supporting portion 204 in the rotational action (the state in FIG. 13). It should be noted that in the example shown in FIG. 13, the rotation restriction portions 202d are provided in two places on the cylindrical inner surface S of the bearing portion 202b, and the two rotation restriction portions 202d simultaneously abut the side surfaces (more specifically, two side surfaces opposed to each other) of the right controller supporting portion 204 at the initial position. A plurality of rotation restriction portions 202d are thus provided, whereby it is possible to securely stop the rotation of the right controller supporting portion 204 at the initial position. It should be noted that the initial position of the right controller supporting portion 204 may be at any angle. For example, the right controller supporting portion 204 may be tilted by 10 degrees in an elevation direction or a depression direction from the horizontal direction shown in FIG. 13, or the initial angle may be any angle.

As shown in FIG. 14, the user of the accessory 200 can perform the operation of rotation, in a +A direction shown in the figures, the right controller supporting portion 204 stopping its rotational action at the initial position. Specifically, the user performs the operation of twisting the right controller supporting portion 204 that the user holds with their right hand, in the +A direction shown in the figures with a greater force than the biasing forces of the elastic members 202c, whereby the right controller supporting portion 204 rotates in the +A direction shown in the figures along the cylindrical inner surface S of the bearing portion 202b. At this time, the user can further rotate the right controller supporting portion 204 in the +A direction shown in the figures. Further, when the user releases the right controller supporting portion 204 held by the user, the right controller supporting portion 204 rotates in the −A direction shown in the figures by the biasing forces of the elastic members 202c and stops at the initial position. That is, the operation of rotation the right controller supporting portion 204 simulates an accelerator operation on a motorbike. Thus, it is possible to cause the right controller supporting portion 204 to function as the accelerator mechanism of the accessory 200. Then, the right controller 4 attached to the inside of the right controller supporting portion 204 rotates in the roll direction in accordance with the accelerator operation using the right controller supporting portion 204. Thus, it is possible to calculate the accelerator operation (the accelerator position) of the user by detecting this rotation.

It should be noted that also when the user performs the operation of directing the entirety of the accessory 200 upward (the wheelie operation), or when the user performs the operation of directing the entirety of the accessory 200 downward, the right controller 4 attached to the inside of the right controller supporting portion 204 rotates in the roll direction. Thus, with the detection of the rotational action in the roll direction of the right controller 4 alone, it is not possible to distinguish between the operation of directing the entirety of the accessory 200 upward and downward and the accelerator operation. In the exemplary embodiment, to distinguish between the operation of directing the entirety of the accessory 200 upward and downward and the accelerator operation, the difference between the orientation of the left controller 3 and the orientation of the right controller 4 is calculated, and using a value indicating the calculated difference, the accelerator operation (the accelerator position) of the user is calculated. Here, unlike the right controller supporting portion 204, the left controller supporting portion 203 for fixing the left controller 3 cannot rotate in the A direction shown in the figures relative to the main body portion 202 and is fixed to the main body portion 202. That is, the difference between the orientation in the roll direction of the left controller 3 and the orientation in the roll direction of the right controller 4 is considered to be caused by the accelerator operation. In the exemplary embodiment, with the use of such a characteristic of the accessory 200, the accelerator operation (the accelerator position) of the user is calculated using the difference value between the orientation of the left controller 3 and the orientation of the right controller 4.

Further, when the right controller supporting portion 204 is rotated in the +A direction shown in the figures, the side surfaces of the right controller supporting portion 204 rotation along the cylindrical inner surface S of the bearing portion 202b abut the rotation restriction portions 202d (the state in FIG. 15). Specifically, the side surface of the right controller supporting portion 204 abutting an abutment surface on one side of the rotation restriction portions 202d at the initial position abuts an abutment surface on the other side of the rotation restriction portions 202d, thereby stopping the rotation of the right controller supporting portion 204. That is, the rotation restriction portions 202d, which function as a stopper for stopping the right controller supporting portion 204 at the initial position, also function as a stopper for stopping the right controller supporting portion 204 at a maximum rotational angle. It should be noted that in the examples shown in FIGS. 13 to 15, an example is used where the maximum rotational angle allowing the right controller supporting portion 204 to rotate is 90 degrees. Alternatively, the maximum rotational angle can be set to various angles depending on the shapes and the number of rotation restriction portions 202d, or the shape of the right controller supporting portion 204.

Next, with reference to FIG. 16, a description is given of a brake mechanism provided in the accessory 200. As described above, the brake operation section 206 is provided in the right controller supporting portion 204.

As shown in FIG. 16, the brake operation section 206 penetrates to the inside of the right controller supporting portion 204, and a part of the brake operation section 206 protrudes to the outside of the right controller supporting portion 204, as an operation piece capable of being operated by the user. Then, the brake operation section 206 is provided on the front side surface (the surface on the opposite side opposed to the side surface on the side where the user operates the accessory 200) of the right controller supporting portion 204. Thus, it is possible to perform the operation of moving the operation piece of the brake operation section 206 to the near side (in a +C direction shown in the figures) by pulling the operation piece close to the front side surface. Further, the brake operation section 206 is biased in a direction (a −C direction shown in the figures) opposite to the direction of the above operation. For example, the brake operation section 206 is biased in the −C direction shown in the figures by tension stress caused by an elastic member 206a, which is provided in a stretched manner between the brake operation section 206 and a member within the right controller supporting portion 204. In the example shown in FIG. 16, on a side surface further in the +C direction of the brake operation section 206, an elastic member hook portion 206b is formed, to which the elastic member 206a (e.g., a rubber band) is hooked. Then, one end of the elastic member 206a is fixed to the member within the right controller supporting portion 204, and the other end of the elastic member 206a is hooked to the elastic member hook portion 206b, whereby the brake operation section 206 is biased in the −C direction shown in the figures.

It should be noted that in the above example, the brake operation section 206 is biased by the elastic member 206a such as a rubber band. Alternatively, the elastic member 206a may not be included. For example, the brake operation section 206 may be biased in the −C direction shown in the figures, using the restoring force of the brake operation section 206 or the right controller supporting portion 204 itself.

The user of the accessory 200 can perform the operation of tilting, in the +C direction shown in the figures, the operation piece of the brake operation section 206 biased in the −C direction shown in the figures. Specifically, the user performs the operation of tilting the brake operation section 206 in the +C direction shown in the figures with a greater force than the biasing force of the elastic member 206a, whereby the brake operation section 206 tilts toward the right controller 4 attached to the inside of the right controller supporting portion 204. Then, a part of the brake operation section 206 tilting in the +C direction shown in the figures abuts the first R-button 60 of the right controller 4. Thus, it is possible to perform a pressing operation on the first R-button 60 by the operation of tilting the brake operation section 206 in the +C direction shown in the figures. Further, when the user releases the brake operation section 206 that is tilting, the brake operation section 206 stands in the −C direction shown in the figures and stops by the biasing force of the elastic member 206a. That is, the operation of tilting the brake operation section 206 simulates a brake operation on a motorbike. Thus, it is possible to cause the brake operation section 206 to function as the brake mechanism of the accessory 200. Then, the pressing operation on the first R-button 60 of the right controller 4 is detected, whereby it is possible to detect the brake operation of the user.

Next, with reference to FIG. 17, a description is given of a blinker mechanism provided in the accessory 200. As described above, the blinker operation section 205 is provided in the left controller supporting portion 203.

As shown in FIG. 17, the blinker operation section 205 penetrates to the inside of the left controller supporting portion 203, and a part of the blinker operation section 205 protrudes to the outside of the left controller supporting portion 203, as an operation piece capable of being operated by the user. Then, the blinker operation section 205 is provided on the back side surface (the side surface on the side where the user operates the accessory 200) of the left controller supporting portion 203. Thus, it is possible to perform the operation of moving the operation piece of the blinker operation section 205 to the left (in a +D direction shown in the figures) or the right (in a −D direction shown in the figures).

As shown in a middle part of FIG. 17, when the operation piece of the blinker operation section 205 is moved to the left (in the +D direction shown in the figures), the blinker operation section 205 tilts (rotates) to the right about a predetermined fixing portion (a shaded area having a band shape shown in FIG. 17). Consequently, a portion of the blinker operation section 205 on the side closer to the operation piece with respect to the fixing portion moves to the left side, and a portion of the blinker operation section 205 on the side closer to a front portion with respect to the fixing portion is moves to the right side. The blinker operation section 205 thus moves, whereby the portion of the blinker operation section 205 on the side closer to the operation piece moves toward the left controller 3 attached to the inside of the left controller supporting portion 203, and the portion of the blinker operation section 205 on the side closer to the front portion moves in a direction away from the left controller 3 attached to the inside of the left controller supporting portion 203. Then, a part of the blinker operation section 205 moving in accordance with the operation of moving the operation piece in the +D direction shown in the figures abuts the ZL-button 39 of the left controller 3. Thus, it is possible to perform a pressing operation on the ZL-button 39 by the operation of moving the blinker operation section 205 in the +D direction shown in the figures.

Further, as shown in a lower part of FIG. 17, when the operation piece of the blinker operation section 205 is moved to the right (in the −D direction shown in the figures), the blinker operation section 205 tilts (rotates) to the left about the predetermined fixing portion (the shaded area having a band shape shown in FIG. 17). Consequently, the portion of the blinker operation section 205 on the side closer to the operation piece with respect to the fixing portion moves to the right side, and the portion of the blinker operation section 205 on the side closer to the front portion with respect to the fixing portion moves to the left side. The blinker operation section 205 thus moves, whereby the portion of the blinker operation section 205 on the side closer to the front portion moves toward the left controller 3 attached to the inside of the left controller supporting portion 203, and the portion of the blinker operation section 205 on the side closer to the operation piece moves in a direction away from the left controller 3 attached to the inside of the left controller supporting portion 203. Then, a part of the blinker operation section 205 moving in accordance with the operation of moving the operation piece in the −D direction shown in the figures abuts the first L-button 38 of the left controller 3. Thus, it is possible to perform a pressing operation on the first L-button 38 by the operation of moving the blinker operation section 205 in the −D direction shown in the figures.

As described above, it is possible to perform a pressing operation on the ZL-button 39 of the left controller 3 by moving the operation piece of the blinker operation section 205 to the left. Further, it is possible to perform a pressing operation on the first L-button 38 of the left controller 3 by moving the same operation piece to the right. That is, the operation of moving the blinker operation section 205 simulates a blinker operation on a motorbike. Thus, it is possible to cause the blinker operation section 205 to function as the blinker mechanism of the accessory 200. Then, the pressing operation on the ZL-button 39 of the left controller 3 is detected, whereby it is possible to detect the blinker operation of the user indicating the left direction. The pressing operation on the first L-button 38 of the left controller 3 is detected, whereby it is possible to detect the blinker operation of the user indicating the right direction.

Figure 18:
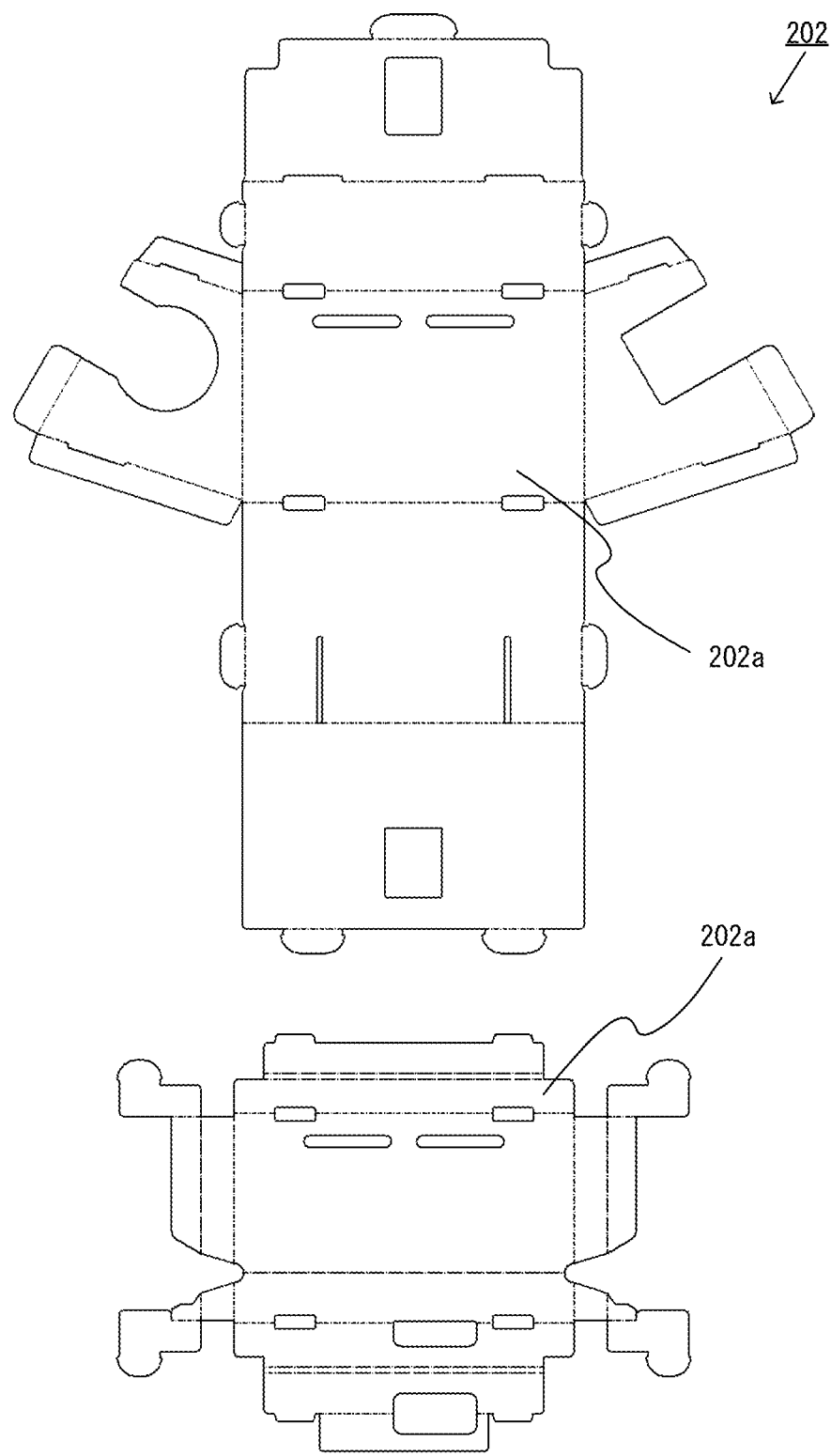
FIG. 18 is a diagram showing non-limiting examples of parts of cardboard members for assembling a main body portion 202.
Figure 19:
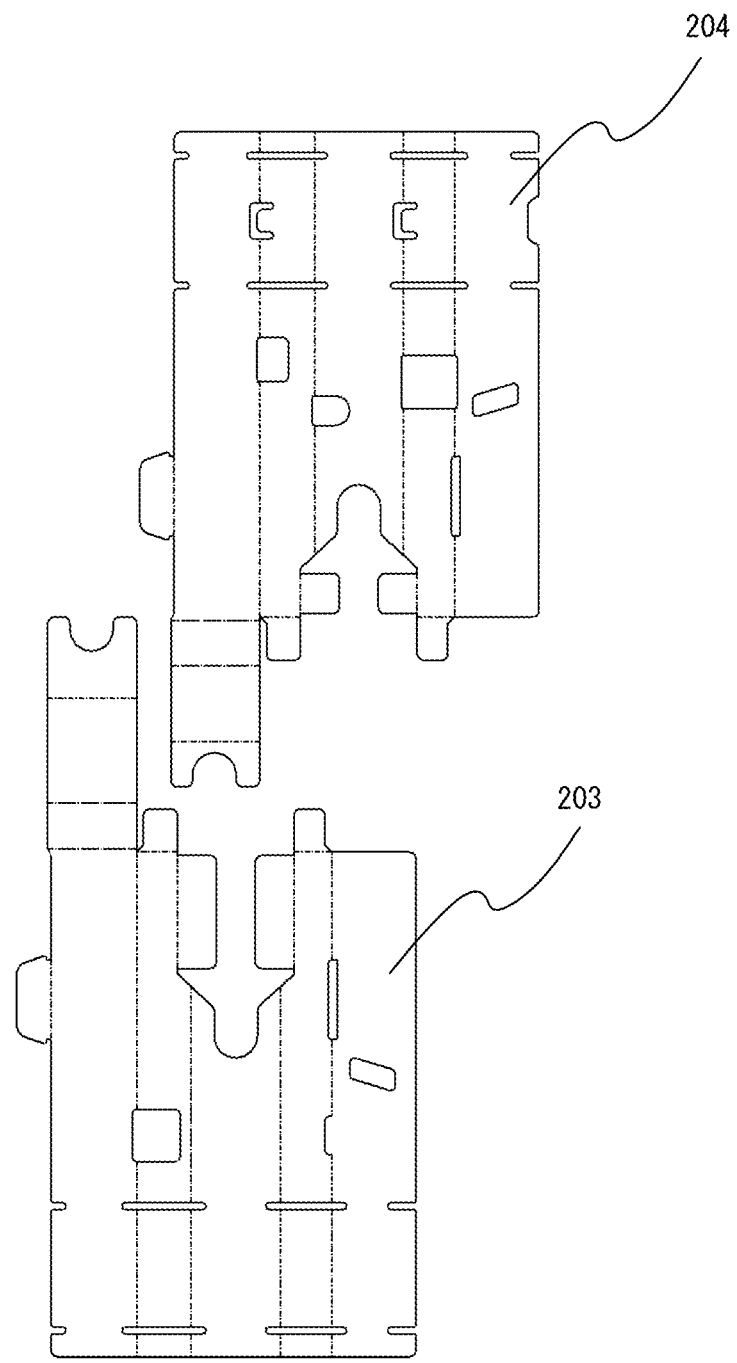
FIG. 19 is a diagram showing non-limiting examples of parts of cardboard members for assembling a left controller supporting portion 203 and a right controller supporting portion 204.

Next, with reference to FIGS. 18 and 19, a method for assembling the accessory 200 is described. It should be noted that FIG. 18 is a diagram showing examples of parts of cardboard members for assembling the main body portion 202. FIG. 19 is a diagram showing examples of parts of cardboard members for assembling the left controller supporting portion 203 and the right controller supporting portion 204. It should be noted that in FIGS. 18 and 19, a solid line indicates a line for cutting off each cardboard member, and a dashed-dotted line indicates a line for mountain-folding or valley-folding each cardboard member.

In FIGS. 18 and 19, components of the accessory 200 are formed by folding the cardboard members. It should be noted that the components shown in FIGS. 18 and 19 merely illustrate parts of the components of the accessory 200, and components that are not shown in FIGS. 18 and 19 are also assembled by folding the cardboard members. Further, in the exemplary embodiment, the cardboard members may be a single plate member having a stack structure or a plurality of plate members bonded together. For example, the cardboard members may each be a so-called corrugated cardboard member, which is formed by bonding a plate-like paper sheet to one surface or both of two surfaces of a corrugated plate-like paper sheet.

The main body portion 202 is formed by folding a single cardboard member into a three-dimensional shape. Then, the main body portion 202 is assembled by incorporating components included in the main body portion 202, such as inserting a member to be a side wall of the main body apparatus fixing portion 202a into the upper surface of the main body portion 202 and fixing the member. Further, main body portions of the left controller supporting portion 203 and the right controller supporting portion 204 are assembled by folding the left controller supporting portion 203 and the right controller supporting portion 204 into angular tubes. Then, the left controller supporting portion 203 and the right controller supporting portion 204 are assembled by incorporating components included in the left controller supporting portion 203 and the right controller supporting portion 204 into the main body portions.

As shown in FIG. 18, the main body portion 202 is assembled by folding a plate member in which a plurality of pass-through holes through which members to be side walls of the main body apparatus fixing portion 202a pass, a bearing hole to be a part of the bearing portion 202b, and the like are formed. Specifically, the plate member is formed of a cardboard member, and the cardboard member is folded into a three-dimensional shape for forming the main body portion 202, thereby assembling the main body portion 202. Further, side wall portions of the main body apparatus fixing portion 202a are assembled by folding a plate member in which insertion tabs to be inserted into the pass-through holes of the main body portion 202 and the like are formed.

As shown in FIG. 19, the left controller supporting portion 203 is assembled by folding a plate member in which a plurality of pass-through holes through which components included in the left controller supporting portion 203 pass, inner walls for fixing the left controller 3 to the inside of the left controller supporting portion 203, a cover of an end portion to be closed after the left controller 3 is attached to the inside of the left controller supporting portion 203, and the like are formed, into an angular tube. The right controller supporting portion 204 is assembled by folding a plate member in which a plurality of pass-through holes through which components included in the right controller supporting portion 204 pass, inner walls for fixing the right controller 4 to the inside of the right controller supporting portion 204, a cover of an end portion to be closed after the right controller 4 is attached to the inside of the right controller supporting portion 204, and a shaft portion for passing through the bearing portion 202b, and the like are formed, into an angular tube.

Then, the accessory 200 is assembled by combining the main body portion 202, the left controller supporting portion 203, the right controller supporting portion 204, and the like. As described above, the accessory 200 is formed by combining components assembled by folding cardboard members. Thus, it is possible to achieve an extension operation device to be assembled by the user using a group of plate-like members as a product form. Further, as described above, the accessory 200 does not need to have an electrical structure such as an electronic circuit for detecting the content of an operation performed by the user and transmitting the detection result to the main body apparatus 2, and therefore can be achieved as the above product to be assembled by the user.

For folding the cardboard member to form a polyhedron shape, the surfaces may be bonded together by any method. For example, the sides of the surfaces may be bonded together by an adhesive tape. An insertion tab may be formed on one of the sides, and an insertion hole may be formed in the other side, so that the insertion tab may be inserted into the insertion hole. The sides of the surfaces may be bonded together by an adhesive agent. In the above-described embodiment, the components of the accessory 200 are each formed of a cardboard member. Alternatively, at least a part of these components may be a thin paper sheet or another type of plate member. For example, at least a part of these components may be assembled by folding a resinous, wooden or metallic thin or thick plate member or may be strip-like fiber members. Further, the elastic members 202c and the elastic member 206a may each be formed of a member made of a metal material or a non-metal material such as rubber, resin, or ceramics. A part of these components may be combined with a component of a different material. For example, a hole (e.g., a bearing hole) through which another member passes can be scraped by the movement of the member. Thus, a ring member or a sheet member made of resin or the like can be inserted into a portion that comes into contact with another member in the hole. At least parts of the components may be provided in advance as a polyhedron component. Further, at least parts of the components may be formed as a polyhedron component in advance.

Figure 21:
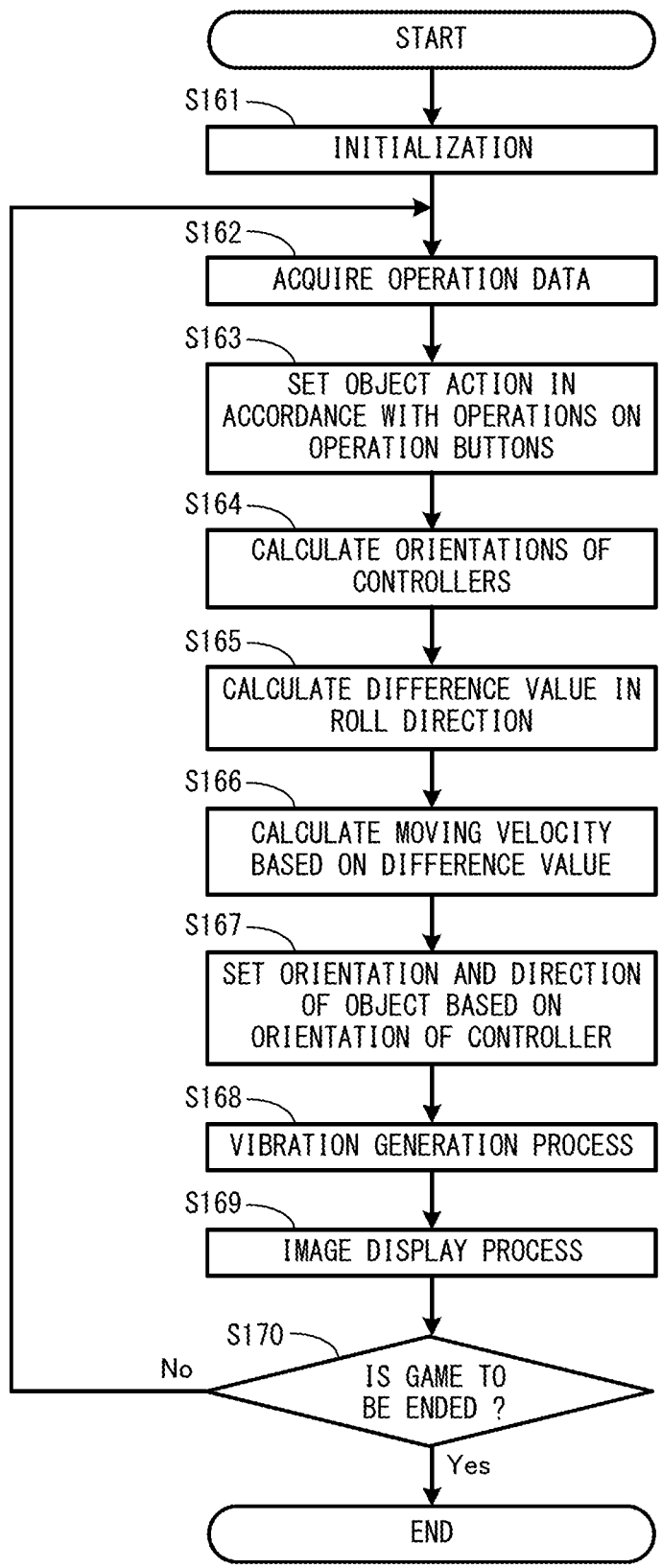
FIG. 21 is a flow chart showing a non-limiting example of information processing executed by the main body apparatus 2.

Next, with reference to FIGS. 20 and 21, a description is given of an example of specific processing executed by the main body apparatus 2 according to the exemplary embodiment. FIG. 20 is a diagram showing an example of a data area set in the DRAM 85 of the main body apparatus 2 according to the exemplary embodiment. It should be noted that in the DRAM 85, in addition to data shown in FIG. 20, data used for other processes is also stored, but is not described in detail here.

In a program storage area of the DRAM 85, various programs Pa, which are executed by the main body apparatus 2, are stored. In the exemplary embodiment, as the various programs Pa, a communication program for wirelessly communicating with the left controller 3 and the right controller 4, an application program for performing information processing (e.g., game processing) based on data acquired from the left controller 3 and/or the right controller 4, a vibration control program for vibrating the left controller 3 and/or the right controller 4, and the like are stored. It should be noted that the various programs Pa may be stored in advance in the flash memory 84, or may be acquired from a storage medium attachable to and detachable from the game system 1 (e.g., a storage medium attached to the slot 23) and stored in the DRAM 85, or may be acquired from another apparatus via a network such as the Internet and stored in the DRAM 85. The processor 81 executes the various programs Pa stored in the DRAM 85.

Further, in a data storage area of the DRAM 85, various data used for processes such as a communication process, information processing, and the like executed by the main body apparatus 2 is stored. In the exemplary embodiment, in the DRAM 85, operation data Da, orientation data Db, difference value data Dc, object action data Dd, moving velocity/moving direction data De, vibration data Df, image data Dg, and the like are stored.

The operation data Da is operation data appropriately acquired from each of the left controller 3 and/or the right controller 4. As described above, the operation data transmitted from each of the left controller 3 and/or the right controller 4 includes information regarding an input (specifically, information regarding an operation or the detection result of the sensor) from each of the input sections (specifically, each button, each analog stick, or each sensor). In the exemplary embodiment, operation data is transmitted from each of the left controller 3 and/or the right controller 4 through wireless communication in a predetermined cycle, and the operation data Da is appropriately updated using the received operation data. It should be noted that the update cycle of the operation data Dc may be such that the operation data Da is updated every frame, which is the cycle of the processing described later executed by the game system 1, or is updated every cycle in which the above operation data is output through the wireless communication. Specifically, the operation data Da includes button operation data Da1, angular velocity data Da2, acceleration data Da3, and the like. The button operation data Da1 is data indicating information regarding an input from each button or each analog stick of the left controller 3 and the right controller 4. The angular velocity data Da2 is data indicating information regarding angular velocities generated in the left controller 3 and detected by the angular velocity sensor 105 of the left controller 3, and information regarding angular velocities generated in the right controller 4 and detected by the angular velocity sensor 115 of the right controller 4. For example, the angular velocity data Da2 includes data indicating angular velocities generated about the xyz axes in each of the left controller 3 and the right controller 4. The acceleration data Da3 is data indicating information regarding accelerations generated in the left controller 3 and detected by the acceleration sensor 104 of the left controller 3, and information regarding accelerations generated in the right controller 4 and detected by the acceleration sensor 114 of the right controller 4. For example, the acceleration data Da3 includes data indicating accelerations generated in the xyz axis directions in each of the left controller 3 and the right controller 4.

The orientation data Db is data indicating each of the orientations of the left controller 3 and the right controller 4 with respect to the direction of a gravitational acceleration in real space. For example, the orientation data Db includes data indicating the direction of a gravitational acceleration acting on each of the left controller 3 and the right controller 4, data indicating xyz axis directions relative to the direction of the gravitational acceleration, and the like.

The difference value data Dc is data indicating a difference value indicating the difference (e.g., the difference in angle) between the orientations of the left controller 3 and the right controller 4 in the roll direction.

The object action data Dd is data regarding the action of a player object placed in a virtual world. The moving velocity/moving direction data De is data indicating the moving velocity or the moving direction of the player object placed in the virtual world.

The vibration data Df is data indicating vibrations for vibrating the left controller 3 and the right controller 4.

The image data Dg is data for displaying images (e.g., an image of the player object, an image of another object, a background image, and the like) on a display device (e.g., the display 12 of the main body apparatus 2) when a game is performed.

Next, a description is given of a detailed example of information processing (e.g., game processing) according to the exemplary embodiment. FIG. 21 is a flow chart showing an example of the information processing executed by the main body apparatus 2. In the exemplary embodiment, a series of processes shown in FIG. 21 is performed by the processor 81 executing the communication program and a predetermined application program (a game program) included in the various programs Pa. Further, the information processing shown in FIG. 21 is started at any timing.

It should be noted that the processes of all of the steps in the flow chart shown in FIG. 21 are merely illustrative. Thus, the processing order of the steps may be changed, or another process may be performed in addition to (or instead of) the processes of all of the steps, so long as similar results are obtained. Further, in the exemplary embodiment, descriptions are given on the assumption that the processor 81 performs the processes of all of the steps in the flow charts. Alternatively, a processor or a dedicated circuit other than the processor 81 may perform the processes of some of the steps in the flow charts. Yet alternatively, part of the processing performed by the main body apparatus 2 may be executed by another information processing apparatus capable of communicating with the main body apparatus 2 (e.g., a server capable of communicating with the main body apparatus 2 via a network). That is, all the processes shown in FIG. 21 may be executed by the cooperation of a plurality of information processing apparatuses including the main body apparatus 2.

In FIG. 21, the processor 81 performs initialization in the game processing (step S161), and the processing proceeds to the next step. For example, in the initialization, the processor 81 initializes parameters for performing the processing described below. Further, in the initialization, the processor 81 sets the type and identification information of the accessory 200 (the extension operation device) to which the main body apparatus 2, the left controller 3, and the right controller 4 are attached, where necessary. For example, the type of the accessory 200 may be initialized by the user performing the operation of selecting the type of the accessory 200, using the main body apparatus 2, the left controller 3, or the right controller 4.

Next, the processor 81 acquires operation data from each of the left controller 3 and the right controller 4 and updates the operation data Da (step S162), and the processing proceeds to the next step. For example, in accordance with the operation data acquired from each of the left controller 3 and the right controller 4, the processor 81 updates the button operation data Da1, the angular velocity data Da2, and the acceleration data Da3.

Next, in accordance with an operation using the operation buttons provided in the left controller 3 and the right controller 4, the processor 81 performs the process of setting an object action (step S163), and the processing proceeds to the next step. For example, using the operation data acquired in the above step S162, the processor 81 determines whether or not the operation buttons provided in the left controller 3 and the right controller 4 (specifically, the first L-button 38 and the ZL-button 39 of the left controller 3 and the first R-button 60 and the ZR-button 61 of the right controller 4) are subjected to pressing operations. Then, when the first L-button 38 is subjected to a pressing operation, the processor 81 sets an action in which a player object indicates the left direction in a virtual space (e.g., the action of blinking a left blinker of a motorbike that the player object rides), thereby updating the object action data Dd. Further, when the ZL-button 39 is subjected to a pressing operation, the processor 81 sets an action in which the player object indicates the right direction in the virtual space (e.g., the action of blinking a right blinker of the motorbike that the player object rides), thereby updating the object action data Dd. Further, when the first R-button 60 is subjected to a pressing operation, the processor 81 sets an action in which the moving velocity of the player object decelerates in the virtual space (e.g., the moving velocity of the motorbike that the player object rides decelerates by a predetermined negative acceleration), thereby updating the object action data Dd. Further, when the ZR-button 61 is subjected to a pressing operation, the processor 81 sets an action in which the engine or the motor of the vehicle that the player object rides is started in the virtual space, thereby updating the object action data Dd.

The processor 81 calculates the orientations of the left controller 3 and the right controller 4 (step S164), and the processing proceeds to the next step. For example, the processor 81 acquires data indicating accelerations generated in the left controller 3 from the acceleration data Da3, calculates the direction of a gravitational acceleration acting on the left controller 3, and updates the orientation data Db of the left controller 3 using data indicating the direction. As a method for extracting a gravitational acceleration, any method may be used. For example, an acceleration component generated on average in the left controller 3 may be calculated and extracted as a gravitational acceleration. Then, the processor 81 acquires data indicating angular velocities generated in the left controller 3 from the angular velocity data Da2, calculates angular velocities about the xyz axes of the left controller 3, and calculates the xyz axis directions of the left controller 3 with respect to the direction of the gravitational acceleration using data indicating the angular velocities, thereby updating the orientation data Db of the left controller 3. Further, the processor 81 acquires data indicating accelerations generated in the right controller 4 from the acceleration data Da3, calculates the direction of a gravitational acceleration acting on the right controller 4, and updates the orientation data Db of the right controller 4 using data indicating the direction. Then, the processor 81 acquires data indicating angular velocities generated in the right controller 4 from the angular velocity data Da2, calculates the angular velocities about the xyz axes of the right controller 4, and calculates the xyz axis directions of the right controller 4 with respect to the direction of the gravitational acceleration using data indicating the angular velocities, thereby updating the orientation data Db of the right controller 4.

It should be noted that after the xyz axis directions with respect to the gravitational acceleration are calculated, the orientations of the left controller 3 and the right controller 4 may be updated in accordance with only the angular velocities about the xyz axes. However, to prevent the relationship between the orientations of the left controller 3 and the right controller 4 and the direction of the gravitational acceleration from shifting due to erroneous accumulation, the xyz axis directions relative to the direction of the gravitational acceleration may be calculated every predetermined cycle, and the orientations of the left controller 3 and the right controller 4 may be corrected.

Next, the processor 81 calculates a difference value indicating the difference between the orientation of the left controller 3 and the orientation of the right controller 4 (step S165), and the processing proceeds to the next step. For example, with reference to the orientation data Db of the left controller 3 and the right controller 4, the processor 81 calculates a difference value indicating the difference in the roll direction between the orientation of the left controller 3 and the orientation of the right controller 4. As an example, the processor 81 calculates as the difference value the difference in angle between the positive x-axis direction (or the positive z-axis direction) in real space of the left controller 3 and the positive x-axis direction (or the positive z-axis direction) in real space of the right controller 4 and updates the difference value data Dc using the difference value.

Next, based on the difference value calculated in the above step S165, the processor 81 calculates the moving velocity (step S166), and the processing proceeds to the next step. For example, the difference value calculated in the above step S165 indicates the difference in the roll direction between the orientation of the left controller 3 and the orientation of the right controller 4. Thus, when an accelerator operation using the right controller supporting portion 204 is performed, the difference value changes in accordance with the rotational angle of the right controller supporting portion 204 in the A direction shown in the figures (see FIGS. 9 and 12 to 15). In the above step S166, an accelerator position is calculated using such a difference value, and the moving velocity at the current moment is changed in accordance with the running slope, the running resistance, the presence or absence of a running interruption, the running capacity, the presence or absence of a brake operation, and the accelerator position. As an example, with reference to the moving velocity/moving direction data De, the processor 81 acquires the moving velocity at the current moment and accelerates the moving velocity such that the greater the difference value, the greater the moving velocity. Then, when the difference value is 0, the processor 81 decelerates the moving velocity by a predetermined negative acceleration. Then, the processor 81 updates the moving velocity/moving direction data De using the accelerated or decelerated moving velocity. It should be noted that when the operation of twisting the accelerator (i.e., an operation in which the difference value is greater than 0) and a brake operation (i.e., an operation in which the first R-button 60 is pressed) are simultaneously performed, the moving velocity may be calculated such that only either one of the operations is valid, or the moving velocity may be calculated by offsetting changes in the moving velocity due to both operations.

Further, in the calculation of the moving velocity in the above step S166, when the difference value calculated in the above step S165 is within a predetermined range, the accelerator position may be set to 0. In this case, even when the difference value is greater than 0, but when the difference value is within the predetermined range, the moving velocity decelerates by a predetermined negative acceleration. As described above, even when the difference value is greater than 0, the range where the accelerator position is 0 is set, whereby it is easy to calibrate the orientation in the roll direction of the right controller 4, and it is also possible to absorb a change in the difference value due to a change over time in the accessory 200, or an error when the left controller 3 and the right controller 4 are attached to the accessory 200.

Next, based on the orientation of the left controller 3, the processor 81 sets the orientation or the direction of the player object (step S167), and the processing proceeds to the next step. For example, when the orientation of the left controller 3 indicated by the orientation data Db indicates a tilt action in the pitch direction (the operation of tilting the entirety of the accessory 200 to the left and right), the processor 81 sets the action of tilting the orientation of the player object to the left and right. Further, in accordance with the tilt angle in the pitch direction of the left controller 3, the processor 81 changes the moving direction to the tilt direction, thereby updating the object action data Dd and the moving velocity/moving direction data De. Further, when the orientation of the left controller 3 indicated by the orientation data Db indicates the action of rotation in the yaw direction (a steering wheel operation using the accessory 200), the processor 81 sets an object action to the action of turning the steering wheel. Further, in accordance with the rotational angle in the yaw direction, the processor 81 changes the moving direction to the direction of the rotation, thereby updating the object action data Dd and the moving velocity/moving direction data De. Further, when the orientation of the left controller 3 indicated by the orientation data Db indicates the action of rotation in the roll direction (the operation of directing the entirety of the accessory 200 upward and downward), then in accordance with the rotational angle in the roll direction, the processor 81 sets the action of tilting the orientation of the player object upward and downward. Further, when the rotational action is performed in the up direction, the processor 81 sets the action of the player object to a wheelie action corresponding to the rotational angle, thereby updating the object action data Dd.

It should be noted that in the process of step S167, based on each of the tilt action in the pitch direction of the left controller 3, the rotational action in the yaw direction of the left controller 3, and the rotational action in the roll direction of the left controller 3, the orientation or the direction of the player object is set. In the process of step S167, however, based on at least one of the actions in the pitch, yaw, and roll directions, the process of setting the orientation or the direction of the player object may be implemented.

Next, the processor 81 performs the process of generating vibration data for vibrating each of the left controller 3 and the right controller 4, and of vibrating the left controller 3 and the right controller 4 (step S168), and the processing proceeds to the next step. For example, the processor 81 generates a vibration waveform corresponding to the type, the moving velocity, the moving direction, and the action of the player object, the situation of the virtual space, and the like, and based on the vibration waveform, generates vibration data for vibrating the left controller 3 and vibration data for vibrating the right controller 4, thereby updating the vibration data Df. Then, in each cycle in which vibration data is transmitted, the processor 81 transmits vibration data corresponding to the cycle to the left controller 3 and the right controller 4. For example, with reference to the vibration data Df, the processor 81 transmits vibration data for a vibration length corresponding to the transmission cycle to the left controller 3 and the right controller 4. The vibration data for each controller is thus transmitted, whereby the left controller 3 and the right controller 4 receiving the vibration data vibrate based on vibration waveforms corresponding to the vibration data.

Next, the processor 81 performs the process of displaying on the display 12 an image of the virtual space where the player object is placed (step S169), and the processing proceeds to the next step. For example, based on the object action data Dd and the moving velocity/moving direction data De, the processor 81 changes the orientation, the direction, the action, the position, and the like of the player object, and based on the changed orientation, direction, action, and position, places the player object in the virtual space. Then, the processor 81 performs the process of generating a virtual space image in which the virtual space where the player object is placed is viewed from a virtual camera placed at a predetermined position (e.g., a viewpoint behind the player object or a first-person viewpoint), and displaying the virtual space image on the display 12 of the main body apparatus 2.

Next, the processor 81 determines whether or not the game is to be ended (step S170). In the above step S170, examples of a condition for ending the game include: the fact that a condition for ending the game is satisfied; and the fact that the user performs the operation of ending the game. When the game is not to be ended, the processing returns to the above step S162, and the process of step S161 is repeated. When the game is to be ended, the processing of the flow chart ends. Hereinafter, the series of processes of steps S162 to S170 are repeatedly executed until it is determined in step S170 that the game is to be ended.

As described above, in the exemplary embodiment, the content of an operation on the accessory 200, which is an example of the extension operation device, is detected based on the orientations of the left controller 3 and the right controller 4 attached to the accessory 200 or pressing operations on the operation buttons. Thus, according to the exemplary embodiment, it is possible to simplify the configuration of the accessory 200, which is an example of the extension operation device. Further, in the exemplary embodiment, the contents of various operations on the accessory 200 can be detected based on the difference value between the orientation of the left controller 3 and the orientation of the right controller 4, or the orientation of the left controller 3. Thus, it is possible to improve the variety of operations using the orientations of the left controller 3 and the right controller 4. Further, the left controller 3 and the right controller 4 are attached to the accessory 200, whereby the left controller 3 is fixed to the main body portion 202, and the right controller 4 can rotate only in the roll direction relative to the main body portion 202. Thus, to calculate the difference value between the orientation of the left controller 3 and the orientation of the right controller 4, the left controller 3 and the right controller 4 are attached to the accessory 200, whereby it is possible to easily extract only the rotational action of the right controller 4 in the roll direction relative to the main body portion 202 and estimate the content of the action.

It should be noted that when the difference value between the orientation of the left controller 3 and the orientation of the right controller 4 is set to 0, the orientations of both the left controller 3 and the right controller 4 may be set in any manner. As a first example, at the time when the game processing is started and the initialization is performed, the difference in angle between a predetermined axial direction (e.g., one of the positive x-axis direction and the positive z-axis direction) of the left controller 3 and a predetermined axial direction (e.g., the same one of the positive x-axis direction and the positive z-axis direction as that of the left controller 3) of the right controller 4 is initialized to 0, thereby setting the relationship between the orientation of the left controller 3 and the orientation of the right controller 4 at this time to the state where the difference value is 0. As a second example, at the time when the user is urged to perform a predetermined operation (e.g., the operation of returning the right controller supporting portion 204 to the initial position), the difference in angle between a predetermined axial direction (e.g., one of the positive x-axis direction and the positive z-axis direction) of the left controller 3 and a predetermined axial direction (e.g., the same one of the positive x-axis direction and the positive z-axis direction as that of the left controller 3) of the right controller 4 is initialized to 0, thereby setting the relationship between the orientation of the left controller 3 and the orientation of the right controller 4 at this time to the state where the difference value is 0. As a third example, when a predetermined axial direction (e.g., one of the positive x-axis direction and the positive z-axis direction) of the left controller 3 and a predetermined axial direction (e.g., the same one of the positive x-axis direction and the positive z-axis direction as that of the left controller 3) of the right controller 4 are the same direction with respect to the direction of gravity, the difference value between the orientation of the left controller 3 and the orientation of the right controller 4 is set to 0.

Further, in the above description, an example has been used where, when the right controller 4 rotates in the +A direction shown in the figures (see FIGS. 9 and 12 to 15), the difference value between the orientation of the left controller 3 and the orientation of the right controller 4 is a positive value. Alternatively, this difference value may be a negative value. As an example, the right controller 4 may be configured to rotate not only in the +A direction shown in the figures but also in the −A direction from the initial position. In this case, the difference value between the orientation of the left controller 3 and the orientation of the right controller 4 is a negative value. As another example, not only the right controller 4 but also the left controller 3 may be able to rotate in +A direction shown in the figures. In this case, the difference value between the orientation of the left controller 3 and the orientation of the right controller 4 can be a negative value.

Further, in the above description, an example has been used where the difference value in the roll direction between the orientation of the left controller 3 and the orientation of the right controller 4 is used. Alternatively, the difference value in another direction may be used. For example, the difference value in the pitch direction between the orientation of the left controller 3 and the orientation of the right controller 4 may be used. In this case, only one of the controllers may be configured to rotate in the pitch direction relative to the main body portion 202. Yet alternatively, the difference value in the yaw direction between the orientation of the left controller 3 and the orientation of the right controller 4 may be used. In this case, only one of the controllers may be configured to rotate in the yaw direction relative to the main body portion 202. Yet alternatively, the difference value between the orientation of the left controller 3 and the orientation of the right controller 4 in a direction obtained by combining at least two of the pitch direction, the yaw direction, and the roll direction may be used. As an example, the difference value in each of the pitch direction, the yaw direction, and the roll direction with respect to the direction of gravity may be used.

Further, in the above description, an example has been used where the left controller supporting portion 203 and the right controller supporting portion 204 are provided in the main body portion 202 such that the longitudinal direction of the left controller supporting portion 203 and the longitudinal direction of the right controller supporting portion 204 are on approximately the same straight line or are left and right directions approximately parallel to each other. Alternatively, the longitudinal direction of the left controller supporting portion 203 and the longitudinal direction of the right controller supporting portion 204 may be different directions. When the longitudinal direction of the left controller supporting portion 203 and the longitudinal direction of the right controller supporting portion 204 are thus different directions, the y-axis direction of the left controller 3 and the y-axis direction of the right controller 4 are placed in different directions in real space. However, after the orientations of both controllers with respect to the direction of gravity are calculated, the difference in angle between the positive x-axis directions or the positive z-axis directions of both controllers is calculated, whereby it is possible to calculate the difference value similarly to the above processing.

Further, in the above description, an example has been used where the difference value between the orientation of the left controller 3 and the orientation of the right controller 4 is used. Alternatively, a difference value with respect to the orientation of the main body apparatus 2 may be used. As described above, the main body apparatus 2 includes the acceleration sensor 89 and the angular velocity sensor 90. In the state where the main body apparatus 2 is attached to the accessory 200 similarly to the left controller 3 and the right controller 4, the main body apparatus 2 can calculate xyz axis directions with respect to the direction of gravity. Thus, with respect to any of the xyz axis directions of the main body apparatus 2 in real space, the difference value between this direction and any of the xyz axis directions of the left controller 3 and/or the right controller 4 is used, whereby it is possible to detect the content of an operation similarly to the above processing.

Further, as described above, a part of the left controller 3 attached to the left controller supporting portion 203 or the right controller 4 attached to the right controller supporting portion 204 may be exposed to outside. Game processing using the exposed operation section may be added. For example, when the analog stick 32 or the analog stick 52 is exposed to outside, then in accordance with a tilt operation on the analog stick 32 or the analog stick 52, the position or the direction of a virtual object or a virtual camera in the virtual space may change.

Further, in the above exemplary embodiment, the method for detecting the motions and the orientations of the left controller 3 and the right controller 4 is merely illustrative, and the motions and the orientations of the left controller 3 and the right controller 4 may be detected using another method or other data. For example, the orientations of the left controller 3 and the right controller 4 are calculated based only on angular velocities generated in each of the left controller 3 and the right controller 4, or calculated by combining angular velocities and accelerations generated in each of the left controller 3 and the right controller 4. Alternatively, the orientations may be calculated based only on accelerations generated in each of the left controller 3 and the right controller 4. Even when accelerations generated in each of the left controller 3 and the right controller 4 are detected, it is possible to calculate the direction in which a gravitational acceleration is generated in each of the left controller 3 and the right controller 4. It goes without saying that it is possible to perform processing similar to that described above in the exemplary embodiment by sequentially calculating the xyz axis directions with respect to the gravitational acceleration. Further, in the above exemplary embodiment, a game image corresponding to an operation using the accessory 200 to which the left controller 3 and the right controller 4 are attached is displayed on the display 12 of the main body apparatus 2. Alternatively, the game image may be displayed on the stationary monitor via the cradle.

Further, each of the main body apparatus 2, the left controller 3, and the right controller 4 may be any apparatus, and may be a mobile game apparatus, any mobile electronic device (a PDA (Personal Digital Assistant), a mobile phone, a personal computer, a camera, a tablet, or the like) or the like.

Further, the above descriptions have been given using an example where the main body apparatus 2 performs information processing (game processing) and a communication process. Alternatively, another apparatus may perform at least some of the processing steps. For example, if the main body apparatus 2 is further configured to communicate with another apparatus (e.g., another server, another image display device, another game apparatus, or another mobile terminal), the other apparatus may cooperate to perform the processing steps. Another apparatus may thus perform at least some of the processing steps, thereby enabling processing similar to that described above. Further, the above information processing (game processing) can be performed by a processor or the cooperation of a plurality of processors, the processor or the plurality of processors included in an information processing system including at least one information processing apparatus. Further, in the above exemplary embodiment, information processing can be performed by the processor 81 of the main body apparatus 2 executing a predetermined program. Alternatively, part or all of the processing of the flow charts may be performed by a dedicated circuit included in the main body apparatus 2.

Here, according to the above variations, it is possible to achieve the exemplary embodiment also by a system form such as cloud computing, or a system form such as a distributed wide area network or a local area network. For example, in a system form such as a distributed local area network, it is possible to execute the processing between a stationary information processing apparatus (a stationary game apparatus) and a mobile information processing apparatus (a mobile game apparatus) by the cooperation of the apparatuses. It should be noted that, in these system forms, there is no particular limitation on which apparatus performs the above processing. Thus, it goes without saying that it is possible to achieve the exemplary embodiment by sharing the processing in any manner.

Further, the processing orders, the setting values, the conditions used in the determinations, and the like that are used in the information processing described above are merely illustrative. Thus, it goes without saying that the exemplary embodiment can be achieved also with other orders, other values, and other conditions.

Further, the above program may be supplied to the main body apparatus 2 not only through an external storage medium such as an external memory, but also through a wired or wireless communication link. Further, the program may be stored in advance in a non-volatile storage device included in the apparatus. It should be noted that examples of an information storage medium having stored therein the program may include CD-ROMs, DVDs, optical disk storage media similar to these, flexible disks, hard disks, magneto-optical disks, and magnetic tapes, as well as non-volatile memories. Alternatively, an information storage medium having stored therein the program may be a volatile memory for storing the program. It can be said that such a storage medium is a storage medium readable by a computer or the like. For example, it is possible to provide the various functions described above by causing a computer or the like to load a program from the storage medium and execute it.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. When used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the exemplary embodiment can be used as a game system, an accessory, a game program, a game apparatus, a game processing method, a cardboard member, and the like that are capable of improving the variety of operations using orientations.

What is claimed is:

1. A game system, comprising:
a first game controller having a first gyro sensor;

a second game controller having a second gyro sensor;
an accessory to and from which the first game controller and the second game controller are attachable and detachable, the accessory being portable and also being dimensioned and shaped in a form of a motorbike; and
a computer configured to execute game processing, wherein
the accessory comprising:
- a first fixing portion configured to fix the first game controller so as to rotate about at least a certain axis, the first fixing portion including a left grip in which the first game controller is fixed; and
- a second fixing portion configured to fix the second game controller, the second fixing portion including a right grip in which the second game controller is fixed, and the computer further configured to:
- calculate, based on an output from the first gyro sensor of the first game controller fixed to the first fixing portion including the left grip, a first value indicating an orientation of the first game controller;
- calculate, based on an output from the second gyro sensor of the second game controller fixed to the second fixing portion including the right grip, a second value indicating an orientation of the second game controller;
- calculate a difference value indicating a difference between the first value, indicating the orientation of the first game controller, and the second value, indicating the orientation of the second game controller; and
- execute a first game process based on the difference value.

2. The game system according to claim 1, wherein
based on the orientation of the first game controller or the orientation of the second game controller, the computer is configured to further execute a second game process different from the first game process,
the second game process is a process of performing orientation control for controlling an orientation of a game object based on at least one of the orientation of the first game controller and the orientation of the second game controller, and
the first game process is a process of, based on the difference value, controlling a motion of the game object in a manner different from the orientation control.

3. The game system according to claim 2, wherein
the first game process is a process of, based on the difference value, controlling at least one of a moving velocity, an acceleration, and a moving distance of the game object in a virtual space.

4. The game system according to claim 1, wherein
the second fixing portion fixes the second game controller so that the second game controller does not rotate about an axis parallel to or approximately parallel to the certain axis.

5. The game system according to claim 1, wherein
the accessory further comprises a biasing portion configured to, when the first game controller fixed to the first fixing portion rotates in a first direction about the certain axis, bias the first game controller so as to rotate in a direction opposite to the first direction.

6. The game system according to claim 5, wherein
the accessory further comprises a first rotation restriction portion configured to restrict rotation so that the first game controller fixed to the first fixing portion does not rotate in a direction opposite to the first direction beyond a first angle.

7. The game system according to claim 6, wherein
the accessory further comprises a second rotation restriction portion configured to restrict rotation so that the first game controller fixed to the first fixing portion does not rotate in the first direction beyond a second angle.

8. The game system according to claim 7, wherein
when the first game controller fixed to the first fixing portion is at an angle between the first angle and the second angle, the biasing portion biases the first game controller so as to rotate toward the first angle.

9. The game system according to claim 1, wherein
the accessory further comprises a main body portion to which a display screen is attached,
in the main body portion, a first side surface and a second side surface are formed to the left and right of an attachment position of the display screen,
the first fixing portion is on the first side surface side, and the second fixing portion is on the second side surface side.

10. The game system according to claim 9, wherein
the accessory further comprises a supporting portion configured to support the main body portion, and
the main body portion pivots together with the first fixing portion and the second fixing portion about the supporting portion.

11. The game system according to claim 1, wherein
the accessory further comprises a shaft portion configured to rotate the first fixing portion and the second fixing portion together.

12. The game system according to claim 1, wherein
the first fixing portion is on one side of the accessory, and the second fixing portion is on the other side of the accessory, which is the opposite side of the first fixing portion.

13. The game system according to claim 1, wherein
each of the first game controller and the second game controller has a longitudinal shape, and
the first fixing portion and the second fixing portion are in the accessory such that a longitudinal direction of the first game controller fixed to the first fixing portion and a longitudinal direction of the second game controller fixed to the second fixing portion, are parallel or approximately parallel to each other.

14. The game system according to claim 1, wherein
the first fixing portion and the second fixing portion are in the accessory such that longitudinal directions of the first fixing portion and the second fixing portion are on the same straight line or approximately the same straight line in the accessory.

15. The game system according to claim 1, further comprising a game apparatus comprising the computer configured to execute the game processing and a display screen configured to display a game screen generated based on a processing result of the computer, wherein
the accessory further comprises a game apparatus fixing portion to which the game apparatus is attachably and detachably fixed.

16. The game system according to claim 1, wherein
at least one of the first game controller and the second game controller further comprises a first button,
the accessory further comprises a movable portion, and
the movable portion comprises:

an operation portion configured to be operated by a hand of a user; and a first button pressing portion configured to move toward the first button in accordance with an operation on the operation portion, thereby pressing the first button of the first game controller fixed to the first fixing portion or the first button of the second game controller fixed to the second fixing portion.

17. The game system according to claim 16, wherein at least one of the first game controller and the second game controller further comprises a second button, and the movable portion comprises a second button pressing portion configured to move toward the second button in accordance with an operation on the operation portion, thereby pressing the second button of the first game controller fixed to the first fixing portion or the second button of the second game controller fixed to the second fixing portion.

18. The game system according to claim 17, wherein when the operation portion is moved in a certain direction in accordance with an operation on the operation portion, the first button pressing portion presses the first button, and when the operation portion is moved in a direction different from the certain direction in accordance with an operation on the operation portion, the second button pressing portion presses the second button.

19. The game system according to claim 1, wherein the difference value corresponds to a difference in angle between the orientation of the first game controller and the orientation of the second game controller.

20. The game system according to claim 1, wherein the difference value corresponds to a difference in roll direction between the orientation of the first game controller and the orientation of the second game controller.

21. The game system according to claim 1, wherein, based on operation of the left grip and the right grip, the first game process is executed, in accordance with the difference value, to operate a virtual motorbike in a specific manner in a virtual game space.

22. An accessory to and from which a first game controller comprising a first gyro sensor and a second game controller comprising a second gyro sensor are attachable and detachable, the accessory comprising:

a first fixing portion configured to fix the first game controller so as to rotate about at least a certain axis, the first fixing portion including a left grip in which the first game controller is fixed; and a second fixing portion configured to fix the second game controller, the second fixing portion including a right grip in which the second game controller is fixed, wherein the accessory is portable and is dimensioned and shaped in a form of a motorbike, and the accessory is configured for use with a computer configured to execute game processing, and the computer is further configured to:

calculate, based on an output from the first gyro sensor of the first game controller fixed to the first fixing portion including the left grip, a first value indicating an orientation of the first game controller;

calculate, based on an output from the second gyro sensor of the second game controller fixed to the second fixing portion including the right grip, a second value indicating an orientation of the second game controller;

calculate a difference value indicating a difference between the first value, indicating the orientation of the first game controller, and the second value, indicating the orientation of the second game controller; and execute a first game process based on the difference value.

23. The accessory according to claim 22, further comprising a biasing portion configured to, when the first game controller fixed to the first fixing portion rotates in a first direction about the certain axis, bias the first game controller so as to rotate in a direction opposite to the first direction.

24. The accessory according to claim 23, further comprising a first rotation restriction portion configured to restrict rotation so that the first game controller fixed to the first fixing portion in the first direction does not rotate in a direction opposite to the first direction beyond a first angle.

25. The accessory according to claim 22, wherein the first fixing portion and the second fixing portion are configured to be formed by folding at least one cardboard.

26. A non-transitory computer-readable storage medium having stored therein a game program executed by a computer of a game apparatus for performing game processing using a first game controller having a first gyro sensor and a second game controller having a second gyro sensor, the first game controller and the second game controller are attachable and detachable to an accessory dimensioned and shaped in the form of a motorbike, the accessory being portable and having a first fixing portion including a left grip in which the first game controller is fixed and a second fixing portion including a right grip in which the second game controller is fixed, the game program causing the computer to provide execution comprising:

calculating, based on an output from the first gyro sensor of the first game controller fixed to the first fixing portion including the left grip, a first value indicating an orientation of the first game controller;

calculating, based on an output from the second gyro sensor of the second game controller fixed to the second fixing portion including the right grip, a second value indicating an orientation of the second game controller;

calculating a difference value indicating a difference between the first value, indicating the orientation of the first game controller, and the second value, indicating the orientation of the second game controller;

executing a first game process based on the difference value; and executing a second game process different from the first game process based on the orientation of the first game controller or the orientation of the second game controller.

27. A game processing method for performing game processing using a first game controller having a first gyro sensor and a second game controller having a second gyro sensor, the first game controller and the second game controller are attachable and detachable to an accessory dimensioned and shaped in the form of a motorbike, the accessory being portable and having a first fixing portion including a left grip in which the first game controller is fixed and a second fixing portion including a right grip in which the second game controller is fixed, the game processing method comprising:

calculating, based on an output from the first gyro sensor of the first game controller fixed to the first fixing portion including the left grip, a first value indicating an orientation of the first game controller;

calculating, based on an output from the second gyro sensor of the second game controller fixed to the second fixing portion including the right grip, a second value indicating an orientation of the second game controller;

calculating a difference value indicating a difference between the first value, indicating the orientation of the first game controller, and the second value, indicating the orientation of the second game controller;

executing a first game process based on the difference value; and executing a second game process different from the first game process based on the orientation of the first game controller or the orientation of the second game controller.

* * * * *